United States Patent
Rachedi et al.

(10) Patent No.: US 11,928,958 B2
(45) Date of Patent: Mar. 12, 2024

(54) METHOD AND DEVICE FOR GUIDING USING A CONNECTED OBJECT IN A BUILDING

(71) Applicants: CENTRE NATIONAL DE LA RECHERCHE SCIENTIFIQUE, Paris (FR); ECOLE NATIONALE DES PONTS ET CHAUSSEES, Champs-sur-Marne (FR); UNIVERSITÉ PARIS EST CRÉTEIL VAL DE MARNE, Créteil (FR); UNIVERSITE GUSTAVE EIFFEL, Champs-sur-Marne (FR)

(72) Inventors: Abderrezak Rachedi, Meaux (FR); Ahmed Mebarki, Champs sur Marne (FR)

(73) Assignees: Centre National De La Recherche Scientifique, Paris (FR); Ecole Nationale des Ponts et Chaussees, Champs-sur-Marne (FR); Universite Paris Est Creteil val de Marne, Creteil (FR); Universite Gustave Eiffel, Champs-sur-Marne (FR)

( * ) Notice: Subject to any disclaimer, the term of this patent is extended or adjusted under 35 U.S.C. 154(b) by 158 days.

(21) Appl. No.: 17/765,892

(22) PCT Filed: Oct. 2, 2020

(86) PCT No.: PCT/EP2020/077750
§ 371 (c)(1),
(2) Date: Apr. 1, 2022

(87) PCT Pub. No.: WO2021/064225
PCT Pub. Date: Apr. 8, 2021

(65) Prior Publication Data
US 2022/0349716 A1   Nov. 3, 2022

(30) Foreign Application Priority Data

Oct. 2, 2019   (EP) .................................... 19306270

(51) Int. Cl.
*G08B 7/06*      (2006.01)
*G01C 21/20*    (2006.01)
(Continued)

(52) U.S. Cl.
CPC ........... *G08B 7/062* (2013.01); *G01C 21/206* (2013.01); *G06V 20/52* (2022.01); *G08B 29/186* (2013.01)

(58) Field of Classification Search
CPC ...... G01C 21/206; G06V 20/52; G08B 7/062; G08B 29/186
See application file for complete search history.

(56) References Cited

U.S. PATENT DOCUMENTS 9,460,053 B2 * 10/2016 Schmidt .................. G06F 17/11
9,898,912 B1   2/2018 Jordan, II et al.
(Continued)

FOREIGN PATENT DOCUMENTS

DE   102011083023 A1   3/2013

OTHER PUBLICATIONS

International Search Report & Written Opinion in PCT/EP2020/077750 dated Dec. 23, 2020 (including translation), 28 pages.
(Continued)

*Primary Examiner* — Seth A Silverman
(74) *Attorney, Agent, or Firm* — Pearne & Gordon LLP

(57) ABSTRACT

This invention relates to a method for users localization and guidance of the movements of the users through a building adapted in relation to an event, along paths leading to one or more given target places, with connected objects (T, T') in communication link with a remote resource server which is (Continued)

a control server (S) accessible by a communication network, comprising the following steps: on the basis of a digital model of the building (BIM, CIM), nodes (N) and edges (A) are computed; a user waiting list is assigned to each passage node; a Directed Acyclic Graph (DAG) of movement toward the target places ("E", "S", "W") is automatically computed with the nodes and the edges (A); the actual location of an event is detected; the actual position of each user located in the building is computed; as a function of the profile of the user, of the user's location in real time in the building causing the inaccessibility of certain nodes of the Directed Acyclic Graph (DAG), the so-called 'updated' Directed Acyclic Graph (DAG') of moving toward the target places; and a sub-graph DODAG' are computed.

20 Claims, 34 Drawing Sheets

(51) Int. Cl.
 *G06V 20/52* (2022.01)
 *G08B 29/18* (2006.01)

(56) References Cited

U.S. PATENT DOCUMENTS

| | | | | |
|---|---|---|---|---|
| 2007/0038369 | A1* | 2/2007 | Devries | G01C 21/3626 701/431 |
| 2008/0319646 | A1* | 12/2008 | Hopkins | G01C 21/26 701/533 |
| 2011/0270654 | A1* | 11/2011 | Banerjee | G06Q 10/047 701/532 |
| 2011/0276266 | A1* | 11/2011 | Ballew | G01C 21/206 701/533 |
| 2017/0242713 | A1* | 8/2017 | Darie | G06F 16/904 |
| 2018/0300162 | A1* | 10/2018 | Kotlicki | G06F 16/64 |

OTHER PUBLICATIONS

S. Cosar, G. Donatiello, V. Bogorny, C. Garate, L. Alvares, F. Bremond. "Towards Abnormal Trajectory and Event Detection in Video Surveillance," IEEE Transactions on Circuits and Systems for Video Technology, 2016.

J. Fonollosa, A. Solorzano, S. Marco, "Chemical Sensor Systems and Associated Algorithms for Fire Detection: A Review," Sensors, vol. 18, 2018.

Omprakash Gnawali and Philip Levis. The ETX Objective Function for RPL, draft-gnawali-roll-etxof-00, IETF, 2010.

Omprakash Gnawali and Philip Levis. The Minimum Rank with Hysteresis Objective Function. RFC 6719. RFC Editor, 2012.

H. Wang, A. Klaser, C. Schmid, and C.-L. Liu, "Action recognition by dense trajectories," in Computer Vision and Pattern Recognition (CVPR), 2011 IEEE Conference on, Jun. 2011, pp. 3169-3176.

E. Cetin, K. Dimitropoulos, B. Gouverneur, N. Grammalidis, O. Gunay, Y. H. Habiboglu, B. U. Toreyin, and S. Verstockt, "Video fire detection: a review," Digital Signal Processing, vol. 23, No. 6, pp. 1827-1843, 2013.

C. Jorgensen and S. Powell, Solving 0-1 Minimax Problems, in The Journal of the Operational Research Society vol. 38, No. 6 (Jun. 1987), pp. 515-522.

* cited by examiner

METHOD AND DEVICE FOR GUIDING USING A CONNECTED OBJECT IN A BUILDING

FIELD OF THE INVENTION

This invention relates to a method for users localization and guidance of the movements of the users through a building in relation to an event, along paths leading to one or more given target places, the guidance being adapted to each user.

PRIOR ART

In the face of natural and technological risk, personal security is a major issue: by way of example, fires in the case of high-rise buildings (for example, 2635 deaths caused by fires in the USA in 2015) and underground transport (subway).

Crowd evacuation models have been widely researched.

The simulations are however oriented toward the pre-disaster part in order to dimension the paths and exits (locations, widths etc.): such as the Olympic stadium in Beijing which had to be evacuated in 8 minutes in the event of an alert.

Despite the diversity of current alert systems (sonic systems, display systems etc.), these solutions are still not capable of supplying simple and effective evacuation solutions (real-time alerts, evacuation route, updating of the route according to events in real time etc.)

The main reasons for these limits are:

lack of flexibility: evacuation notifications generally follow predefined evacuation plans, regardless of the type and degree of threat or danger. This can lead people to dead ends (collapsed ceilings, destroyed staircases, blocked exits etc.) or give rise to more severe problems (leading to spaces with gas leaks and possible explosions).

a lack of "judgement" and panic: in a situation of danger, people hurry to the same exits, which causes congestion at these exits, and thus considerable delays in the evacuation besides collisions and crushes.

insufficient information and instructions: for people who are not familiar with the building, the evacuation instructions may not be useful, or even be useless.

Certain severe catastrophes (power cut, fire etc.) which reduce visibility can aggravate the situation.

It is then necessary to put in place a new strategy to solve the problem, by placing the user as the central point, to offer the user the necessary and relevant information at the right time to better react to the incident.

SUMMARY OF THE INVENTION

The invention uses the current trend to use communication technology, particularly the Internet of Things and digital BIM models which have inspired the idea of extracting possible paths for evacuation in the building, in particular.

The invention allows a method of individualized guidance, in relation to an event, through a building which has enclosed spaces and/or open spaces delimited by obstacles, user movements along paths leading to several given target places, with connected objects in a communication link with a remote resource server which is a control server accessible by a communication network, for example of "cloud computing" type, comprising the following steps:
i— on the basis of a digital building model (BIM, CIM) and for example, in particular, IFC files,
nodes are defined and computed,
the nodes being divided into:
dispatcher nodes;
passage nodes, the passage nodes being points on the path which must be taken by the users to move to the various given target places;
edges are defined and computed,
each edge linking two successive nodes by crossing the spaces without encountering obstacles and without loss of visibility between two successive nodes;
a user waiting list is assigned to each passage node,
a Directed Acyclic Graph (DAG) of movement toward the target places is automatically computed, composed of:
the nodes
the edges,
ii— the actual location of an event in the building is detected and the nature of the event, which is stored in the control server, is determined;
iii— the current position of each user located in the building is computed, with the measurement of the power of the reception signal of the given connected object of the user, embodied by:
for enclosed spaces, a wireless communication link to communication access terminals in communication link with the control server and/or
for open spaces, a wireless or cellular communication link with the control server;
iv— as a function of the nature of the event causing the inaccessibility of certain nodes of the directed acyclic graph (DAG), the so-called "updated" directed acyclic graph (DAG') of movement toward the target places is computed;
v— the actual positions of the users are snapped to the digital model and a computation is made of the dispatcher node Nd associated with each user and located as near as possible to the user;
vi— on the basis of each node of the updated directed acyclic graph, for each user a sub-graph DODAG' (Destination Oriented Directed Acyclic Graph) is computed which corresponds to the path personalized to each user, toward a given target place,
vii— each user is guided, via the connected object of the user or connected objects of the building, by personalized interfaces/signals, to follow the associated sub-graph DODAG', toward a given target place, and the preceding steps ii to vi are repeated, to update the guidance, at a given frequency that is adapted to the event.

The event can take place in real time and can create obstacles which will over time restrict or where applicable increase the DAG (number of nodes and edges), updated at a certain frequency or in real time.

Advantageously,
the associated sub-graph (DODAG') by user is computed using:
an "individual objective function" for each dispatcher node (Nd), based on the user profile, constructed to:
assign to each user, and update all its passage nodes (N) associated with the dispatcher node (Nd), near which each user currently is,
compile and update the waiting lists of each passage node (N) associated with the dispatcher node (Nd), for the user,
compile and update the waiting lists of each passage node (N) for the user throughout the whole building, making it possible to obtain one or more associated sub-graphs (DODAG') per user a "general objective function" constructed on the basis of the "individual objective functions" of all the users, which has input parameters, and as input the waiting lists of each passage node (N) of the whole building of all the users, and as output the associated sub-graphs (DODAG') of all the users, the "general objective function" delivering to each user its sub-graph (DODAG') computed to optimize all the "individual objective functions" of all the users, with respect to the input parameters.

For example, the "general objective function" makes it possible to optimize the waiting lists of all the passage nodes (N), in order to limit the time or distance of travel (which are in this case the input parameters) of all the users toward the target place or places. For this purpose, to ensure total evacuation in an optimal time, a user could make a long detour and be redirected toward a gate further away than the nearest one which he could have taken if he had been the only user.

Thus, for example for certain applications, the input parameters may be considered as the flow parameters of the people in the building

DESCRIPTION OF THE FIGURES

Other objectives, features and advantages will become apparent from the following detailed description with reference to the drawings given by way of illustration and without limitation, among which.

DETAILED DESCRIPTION OF THE INVENTION

Figure 1:
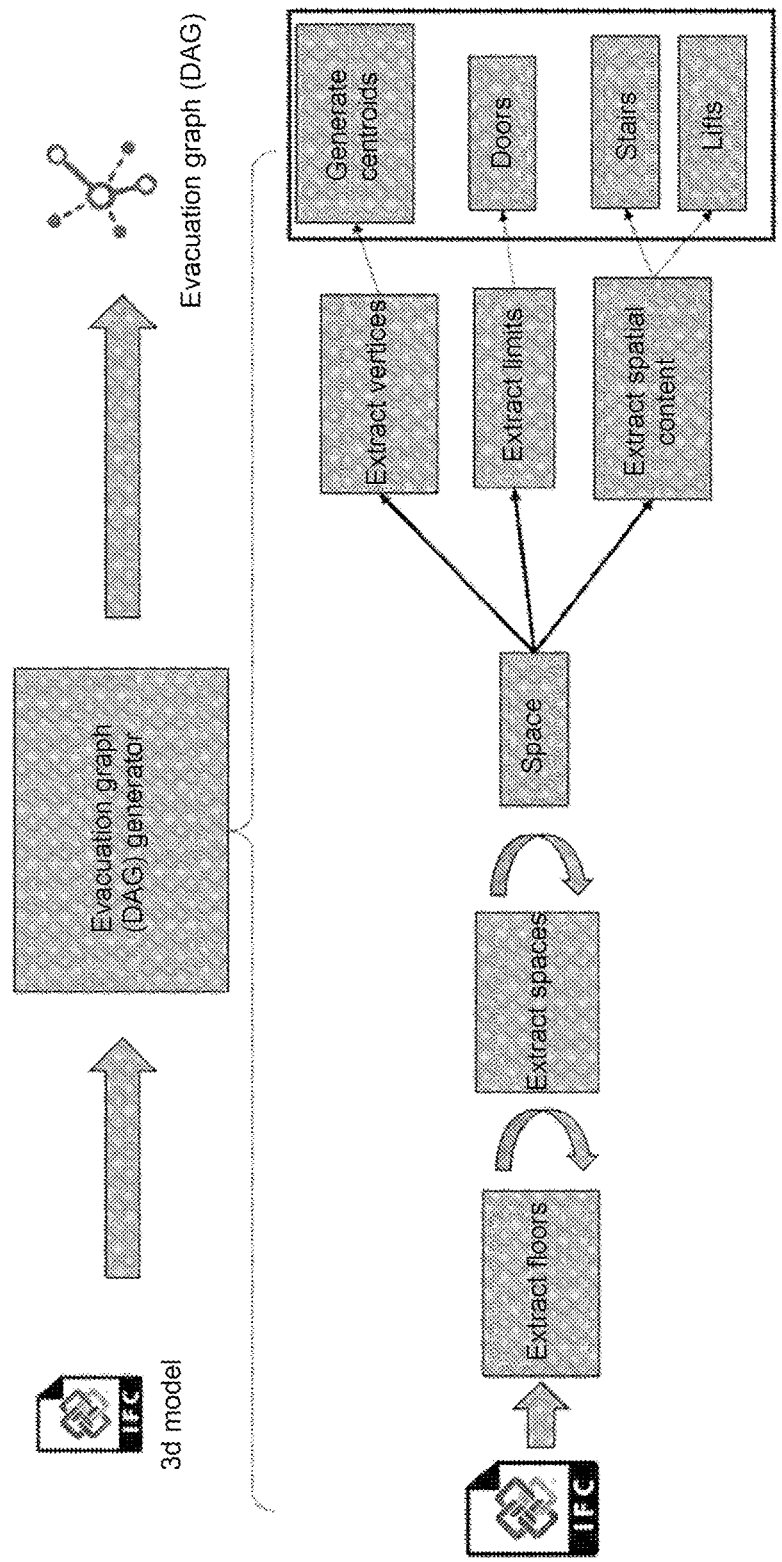
FIG. 1 shows a process for computing the DAG on the basis of a digital BIM model (for example with IFC (Industry Foundation Class) files)
Figure 2:
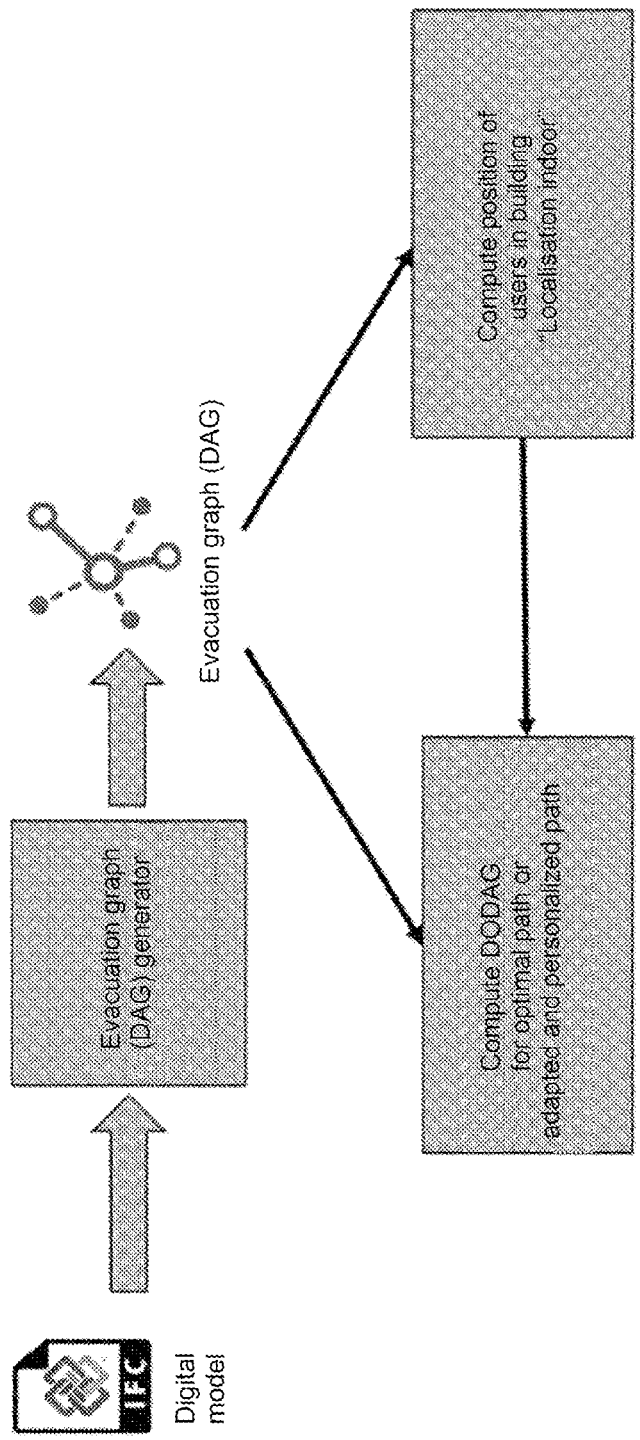
FIG. 2 shows an Interaction between the process for computing the DAG and the processes for locating and computing the DODAG'.
Figure 3:
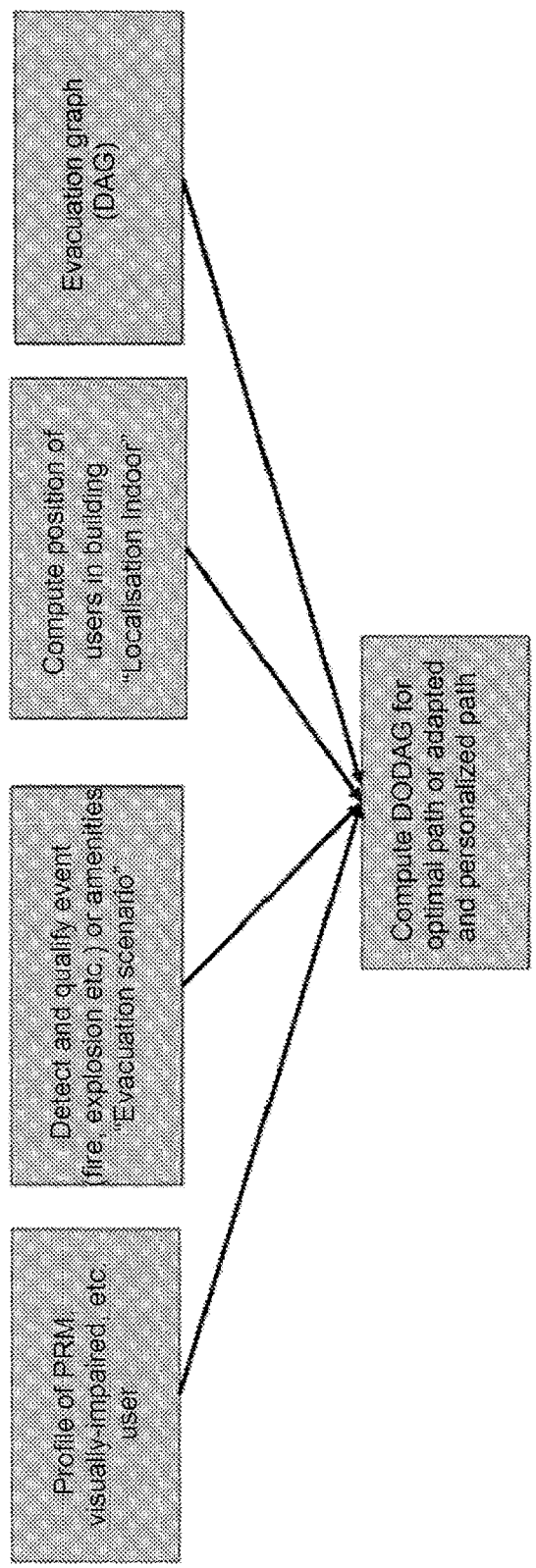
FIG. 3 shows the process for computing the DODAG' (empty), optimal or adapted and personalized path.
Figure 4:
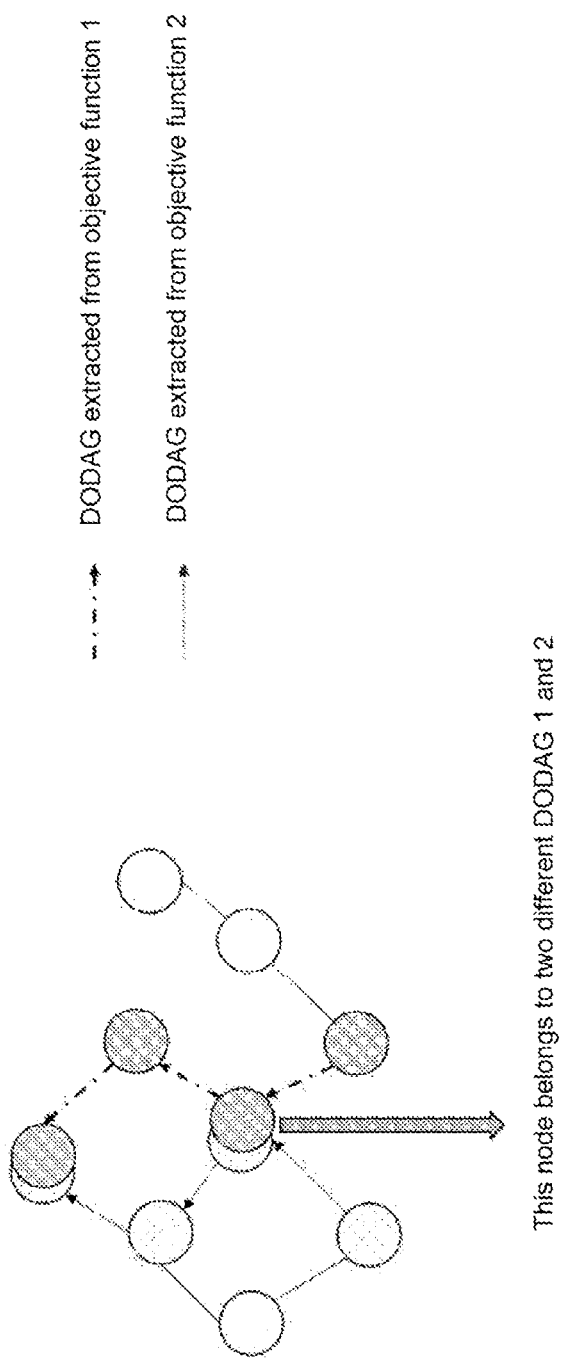
FIG. 4 shows the computation of the optimal or adapted and personalized path DODAG' in section view.
Figure 5B:
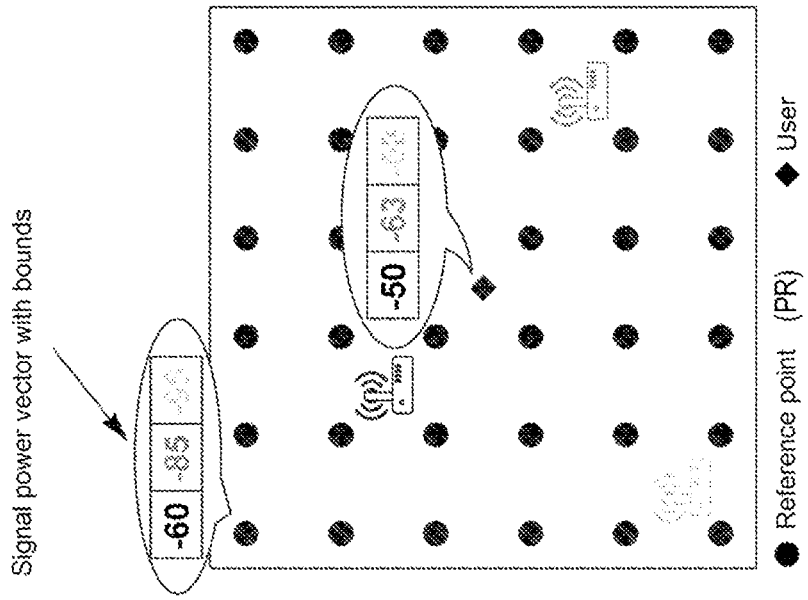
FIG. 5 shows the process for computing the position of the users in the building, "Localization Indoor"
Figure 5A:
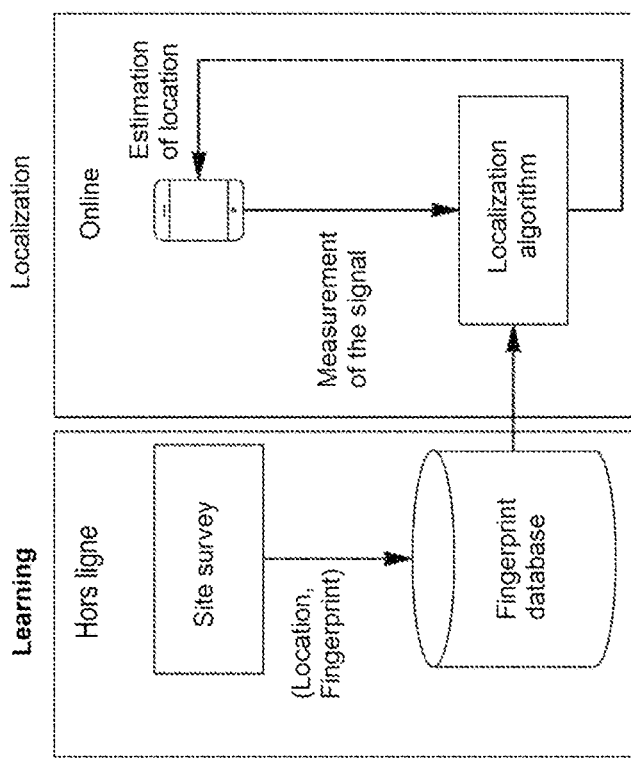
Figure 6:
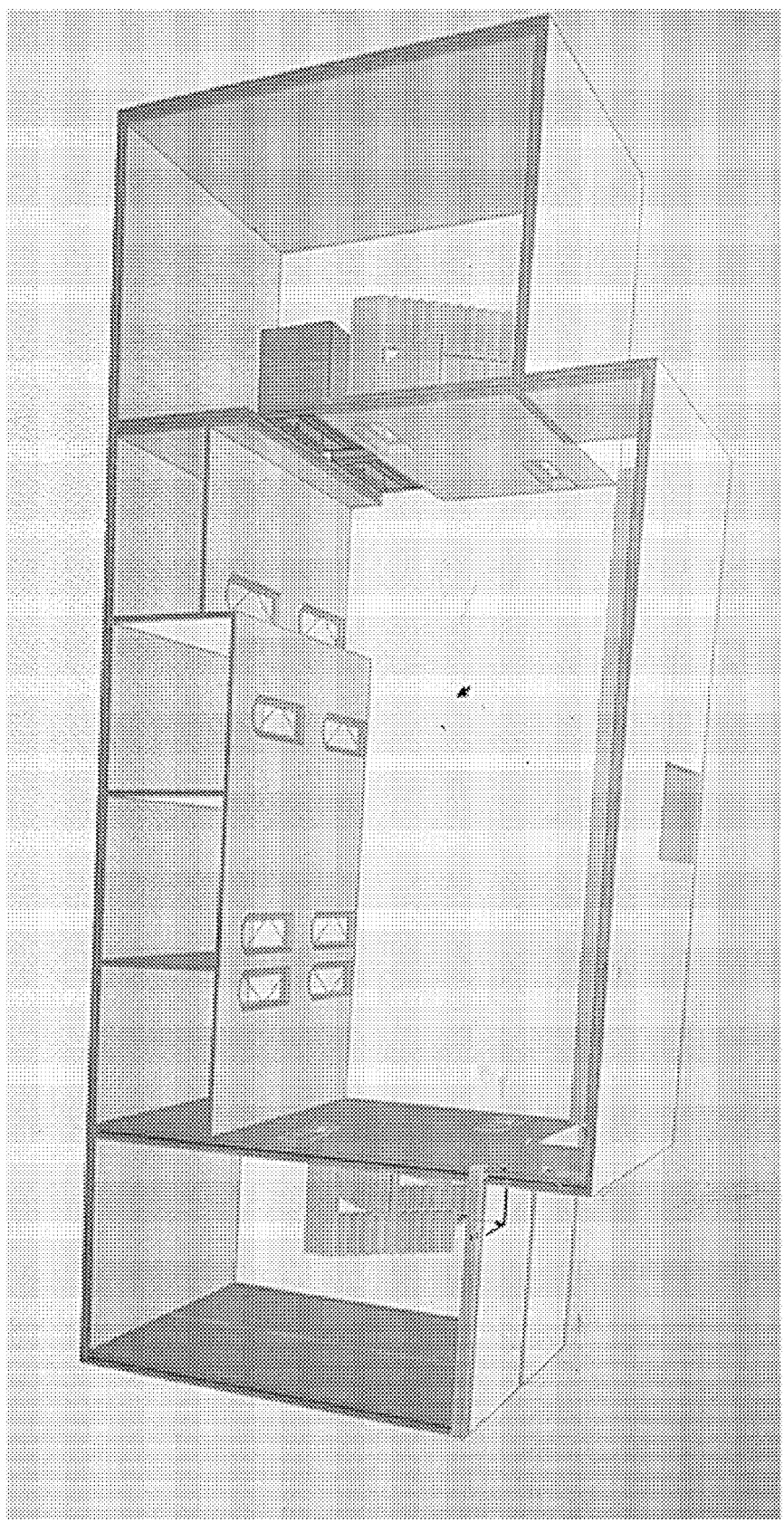
FIG. 6 shows an exemplary embodiment of the invention.
Figure 7A:
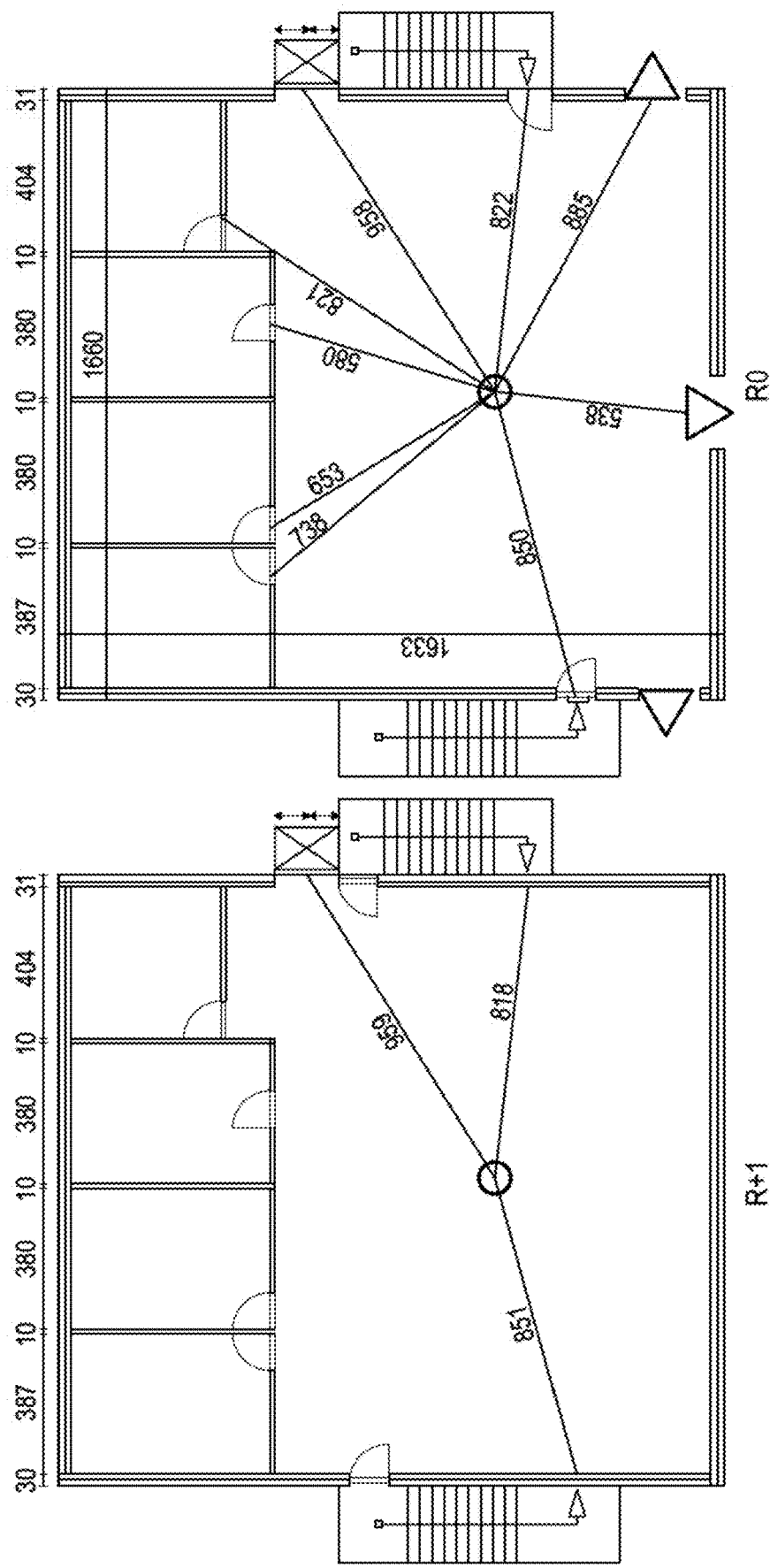
FIGS. 7*a*, 7*b*, 7*c*, 7*d* show the movement of the individuals over the two floors.
Figure 7B:
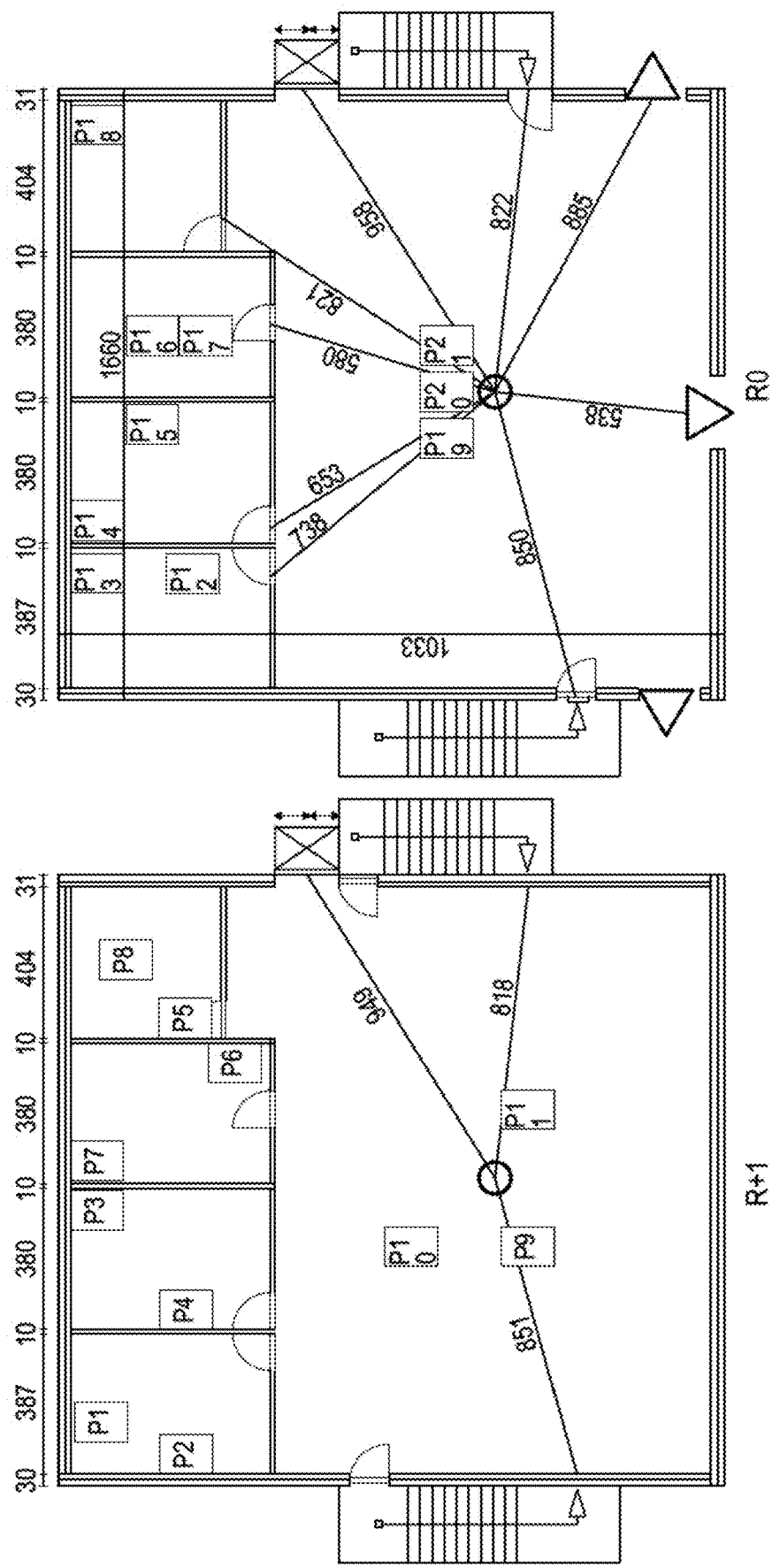
Figure 7C:
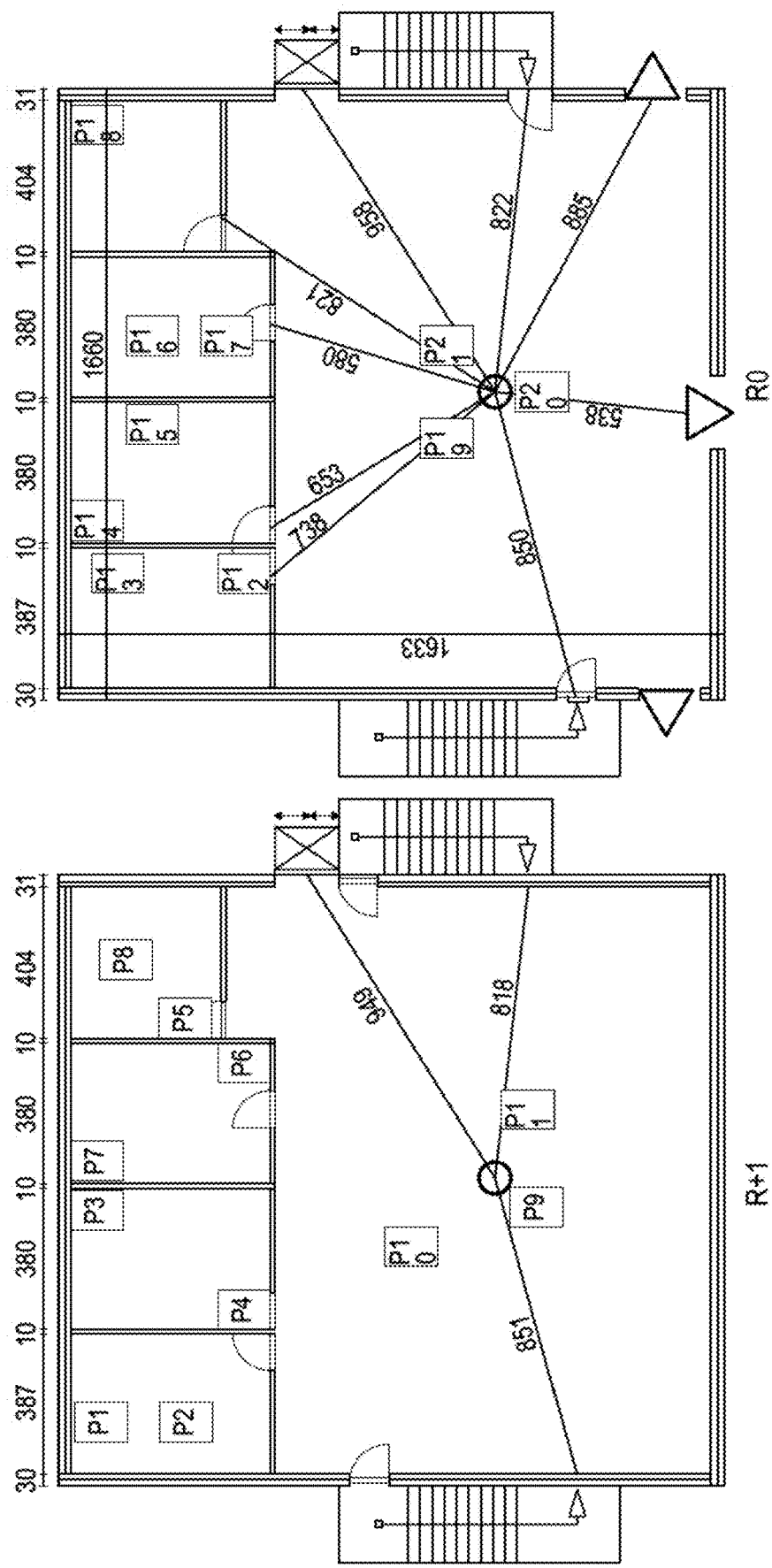
Figure 7D:
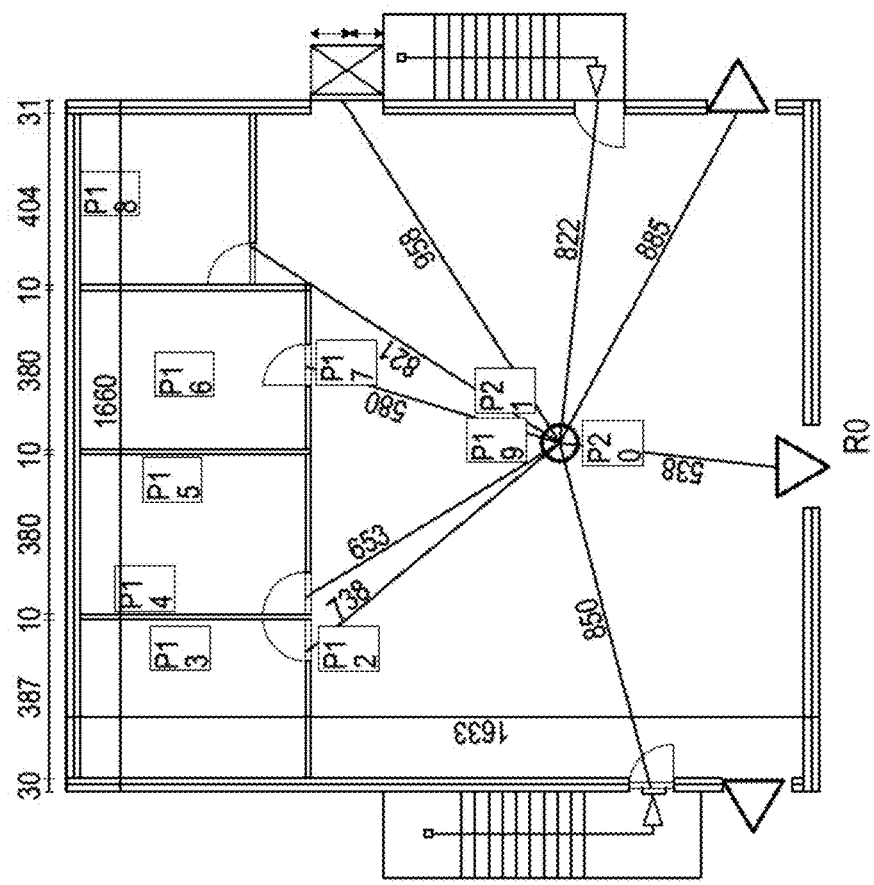
Figure 7D:
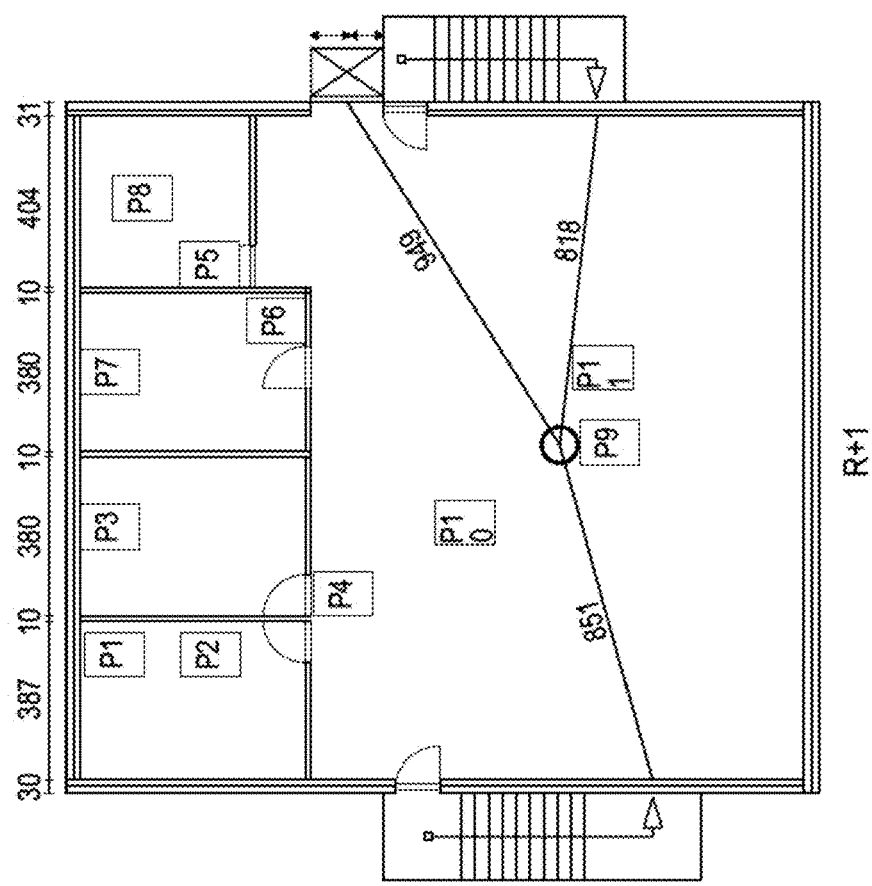

The system is composed of a modular architecture with three sections:

Capture of data from connected objects (Access terminals, Reference points, Sensors).

Mobile/web application which allows the user/administrator to interact with the system (sending of information and notifications).

Services for processing of collected data and synchronization of the database.

The invention is broken down into give complementary modules:

Module 1: Generation/Extraction of the connectivity graph of all positions in the BIM (Building Information Model) (building, infrastructures, sports facilities etc.).

Module 2: Computation of the sub-graphs (set of all possible paths to the various exit doors, starting from any position), which are parts of the general graph (Module 1).

Module 3: Determination/Location of each connected user located in the set to be evacuated. The user's position (correspondence in the BIM model) with reference to anchors in the BIM and radio signals (connected object toward anchors=access terminals such as Wi-Fi terminals).

Module 4: Determination of the optimal trajectories for the individual, according to its profile, the potential paths and positions of the set of people to be evacuated.

Module 5: Guiding via the object connected by personalized interfaces/signals (image on screen, sound indication, directional vibrations on wristbands or sticks, guiding by an agent or light signals, drones or drone swarms).

In other words, the method according to the invention has the following steps:

i— on the basis of a digital model of the building (BIM, CIM), nodes are defined and computed, the nodes being divided into:

dispatcher nodes Nd;

passage nodes N, the passage nodes N being points on the path which must be taken by the users to move toward the various given target places;

edges A are defined and computed, each edge A linking two successive nodes by crossing the spaces without encountering the obstacles and without loss of visibility between two successive nodes; it is possible to take into account the "architectural" space delimited by panels and the separating walls, and also truly "navigable" spaces within the "architectural spaces", taking into consideration the actual obstacles and obstructions to the passage of users, which may be objects or other users; thus the obstacles comprise panels and walls but also objects or other obstructions to the passage of users; thus the spaces have nodes and edges which are delimited by obstacles to the movements of the users; whether these obstacles are walls and/or objects or otherwise, and whether they are generated by the event or not;

user profiles are defined, each user profile determining nodes and edges through which the users of this profile can move; and so on for all the profiles;

each passage node is assigned a user waiting list for example updated in real time; for the categories of users that can take these passages (by way of example, a passage node pertaining to a stair or escalator cannot contain users such as People with Reduced Mobility (PMR) without accompaniment or specific equipment, to take these stairs or escalators; accessways and paths dedicated to authorized personnel such as evacuation and security officers, specific surfaces and spaces of navigation for "mechanized users" such as robots and other automata, etc.);

preferably taking into account the obstacles, a directed acyclic graph (DAG) of movement toward the target places is automatically computed, composed of:

the nodes N, the edges A, ii— the actual location of an event in the building is detected and the nature of the event is determined, and stored in the control server S;

iii— the actual position of each user located in the building is computed, with the measurement of the power of the reception signal of the given connected object of the user, embodied by:

for enclosed spaces, a wireless communication link to communication access terminals B in communication link with the control server S and/or for open spaces, a wireless or cellular communication link with the control server S;

iv— as a function of the nature of the event causing the inaccessibility of certain nodes of the directed acyclic graph (DAG), the so-called 'updated' directed acyclic graph (DAG') of movement toward the target places is computed; thus, this event usually reduces the number of nodes and edges of the DAG, and can be seen as one or more additional obstacles;

v— the actual positions of the users are snapped to the digital model and the dispatcher node Nd associated with each user is computed and located as near as possible to the user;

vi— on the basis of the updated directed acyclic graph and of the dispatcher node (Nd) associated with each user, for each user a sub-graph DODAG' is computed corresponding to the personalized path for each user toward a given target place, vii— via the connected object of the user T or the connected objects T of the building, by personalized interfaces/signals, each user is guided to follow the associated sub-graph DODAG', toward a given target place, and the preceding steps ii to vi are repeated, at a given frequency that is adapted to the event.

Thus, during the guidance, the user may be caused to have a target place that changes as a function of the event and of the itineraries of the other users.

An enclosed space is a space defined as a space wherein the user can connect via its connected object to the control server S, solely via communication access terminals B installed in the building (local connection only) and in communication link with the control server S. Unlike the open space in which the connection of the connected object of the user is possible either by communication access terminals B or by cell access.

This invention specifically considers the truly "navigable" spaces (taking into consideration the actual obstacles and obstructions to the passage of users: case of fixed or heavy furniture, stadium seats and armchairs of event venues or amphitheaters, installations and equipment in machines and workshops, stands in rooms and exhibition halls, by way of illustration; similarly, the navigable spaces must exclude, in a dynamic way that varies over time, certain perimeters in the case of alerts and security measures in the environs of suspect baggage or sources and leaks of toxic substances or smoke in the case of fire etc.); furthermore, additional obstacles, which may arise from the fact that any event (earthquakes, fire, physical threats, leakages of substances etc.) are automatically and dynamically, in real time, taken into account for the updating of "truly navigable" spaces The dispatcher nodes Nd are nodes which users may take. They are linked to the passage nodes N (which are the nodes through which the user must necessarily pass to exit)

In an open space, there are several possibilities for locating the connected object:

1) if it is equipped with a GPS module it can be located via the satellite;
2) if it is equipped with a cellular communication interface (4G), it can be located based on the cell relays,
3) if it is equipped with a communication interface on an ISM (non-cellular) frequency band, training techniques based on the power of the signal can be used to locate it.

The connected objects T embedded by the users may be used either solely to compute the position of the users (and in this case there are connected objects T located in the building which make it possible to guide the users), or to compute the position of the users and to guide the users.

Advantageously, the computation for each user of the sub-graph DODAG' is performed using:

an "individual objective function" for each dispatcher node Nd, based on the profiles of the users, to:
  assign to each user all its passage nodes N associated with the dispatcher node Nd, near which each user currently is,
  compile the waiting lists of each passage node N associated with the dispatcher node Nd,
  compile the waiting lists of each passage node N of all the enclosed and/or open spaces,
a "general objective function" on the basis of the "individual objective functions", which has as input the state of the waiting lists of all the passage nodes N of all the users in the set of enclosed and/or open spaces.
to optimize at the output, the waiting lists of all the passage nodes N, with respect to input parameters or input criteria (for example, the time or distance of travel of all the users toward the target places such as ("E", "S", "W").

In other words, advantageously, the "general objective function" delivers as output all the sub-graphs, (DODAG') of the users, computed to optimize the input parameters (for example reducing the time and/or distance of travel of all users), taking into account each of their profiles and their location in the building. The "general objective" function thus makes it possible to select for each user, from among all the possible DODAG' of each user determined by the "individual objective function", the DODAG for each user of the user group that allows the optimization of the input parameters.

In other words, the "general objective function" delivers the waiting lists of all the nodes, varying over time and which are temporally optimized (here as small as possible at each step of travel of all the users between two neighbor nodes) taking into account each profile and their position in the building (to authorize only certain movements or specific movement distances for given users). By way of example, to ensure a total evacuation in optimal time, a user could make a long detour and be redirected, due to the overall waiting time or conflicting trajectories in the case of crossed flows of people, toward a gate further away than the nearest, which he would have taken if he had been the sole user.

Advantageously, the optimization of the "general objective function" is performed with one of the following strategies:
  linear (max);
  MRHOF (Minimum Rank with Hysteresis Objective Function).
  This function is standardized by the IETF (Internet Engineering Task Force) in the form of an RFC (Request For Comments) number: 6719; a publication reference is Omprakash Gnawali and Philip Levis. (2012).
    "ETX Objective Function"; used in the context of network transmission based on the number of packets transmitted and received (it measures the reliability of a communication link). In our case, it measures the reliability of a path in terms of flow (Omprakash Gnawali and Philip Levis, 2010).
  min max strategy; this strategy consists in minimizing the maximum loss (i.e. in the worst-case scenario). This strategy is very well-known in optimization and operational search problems; a possible reference is C. Jorgensen and S. Powell (1987).
The "individual objective function" can also be fuzzy logic.

With an individual objective function, at the dispatcher node Nd level (vertex: $V_j$, j being the node index), $$S_j = \sum_{k=0}^{k} \alpha_i \cdot \left(\frac{m_i}{\gamma_i}\right),$$

where $\alpha$=membership value $$\alpha_i = \begin{cases} 0 & \text{if } m_i < m_i^{lo} \\ 1 & \text{if } m_i^{lo} \leq m_i \leq m_i^{hi} \\ +\infty & \text{if } m_i^{hi} < m_i \end{cases}$$

and
the relative weight vector for normalization $\Gamma=[\gamma_0, \gamma_1, \ldots, \gamma_k]$, with the parameter value intervals:
  $m_i^{min}$ the smallest possible value of $m_i$,
  $m_i^{lo}$ the lower bound for starting to consider $m_i$,
  $m_i^{hi}$ the upper bound before considering only $m_i$,
  $m_i^{max}$ the maximum possible value of $m_i$,
  and the optimum bound by the "general objective function" corresponding to the whole tree $$P_\zeta(V_j) = \min_{\zeta \in Z}(S_\zeta),$$

on the oasis or the functions on each Dispatcher node Nd "vertex: $V_j$".

Advantageously, the profiles of the users may include the following information, for the purpose of computing the personalized DODAG':
  mobility category: Person with Reduced Mobility, child;
  the age of the user;
  presence of other specific users (given or part of its family);
  the different profiles distinguished (visually impaired; hearing-impaired; claustrophobic).
The event may be:
  an emergency (personal safety, parcel bomb, fire, explosion, collapse of a part of a built structure, obstacle, threat situation, exclusion zone etc.), and the method can be used to evacuate people toward the target places which are exits, or
  so-called normal (amenities search or routing to points of interest, for example stores, cultural centers, sports facilities, stations, airports etc., streamlining queues, guiding delivery staff to delivery points/customers, or target locations such as event venues etc.) and the method makes it possible to route the users to the target places.

Advantageously in step ii, the nature of the event and its actual location in the building are determined:
  a) automatically by algorithms and/or
  b) manually by inputting user information which is sent to the control server S, in order to determine in the evacuation graph the nearest nodes to the event.

There are several techniques for detection of anomalies, for example based on video surveillance.
The two most commonly used approaches are:
  1) based on trajectory analysis,
  2) based on pixel analysis.
Here are examples of references:
H. Wang et al. (2011), S. Cosar et al. (2016).

For fire detection algorithms, the following references may be considered:

1— Based on images/video: e.g. E. Cetin et al. (2013).
2— Based on sniffer detectors C: e.g. J. Fonollosa et al. (2018).

The event detection sensors C that can be used may be of various types: camera, sniffer detector, or the connected object itself.

This therefore includes all physical sensors C (such as for detection of fire, toxic gas etc.), but also virtual sensors C which are data merging and analysis algorithms (scalar or multimedia). For example, singularity detection on the basis of an image or video analysis. Often machine learning and artificial intelligence techniques are used.

In an embodiment the building has several floors, and in step vi a sub-graph DODAG' is computed, on the basis of each passage node, on all the floors interconnected via the inter-floor passage nodes (stairs, ramps, escalator, lifts etc.) which is extracted from the overall DAG to process any position in the building.

Advantageously, in step ii, in a learning step, a measurement is taken of the power of the reception signal of the connected object located at known positions in the building as a function of the wireless communication terminals B and the power relationship of the reception signal and position in the building is determined, for example with a KNN algorithm.

Advantageously, the personalized interfaces/signals of step vii are:
  images on a screen,
  by Virtual and Augmented Reality (VAR),
  sound indication, directional vibrations on wristbands or sticks, guiding by an agent or light signal, drones or drone swarms This invention also relates to the device for individualized location and guidance D, in relation to an event, of user movements, through a building which has enclosed spaces and/or open spaces delimited by obstacles, along paths leading to several given target places.

This device has:
  a remote resource server which is a control server S accessible by a network of cloud computing type;
  sensors C for detecting an event automatically, semi-automatically or manually, and its actual location in the building, which is stored in the control server S;
  computing means M linked to the control server S and to the sensors C.

These computing means M make it possible, in a first step:
  i— on the basis of a digital model of the building (BIM, CIM),
  to compute nodes N divided into:
    dispatcher nodes Nd (case of centroidal points in a space such as a room, hall, corridor etc.);
    passage nodes (for example doors, lift entrances and exits, top and bottom points of ramps or stairs etc.), the passage nodes being points on the path that must be taken by the users to move toward the various given target places "E", "S", "W";
  computing edges A, each edge linking two successive nodes by crossing the spaces without encountering obstacles and without loss of visibility between two successive nodes.
  assigning, to each passage node, a user waiting list;
  automatically computing a Directed Acyclic Graph (DAG) of movement toward the target places composed of:
    the nodes N
    the edges A.

Next, these computing means M make it possible, in a second and third step, to:
  ii+iii— compute the actual position of each user located in the building, with the measurement of the power of the reception signal of the given connected object of the user, performed by:
    for enclosed spaces, a wireless communication link to communication access terminals B in communication link with the control server S, the access terminals B having a position identified in the digital model (BIM, CIM) and serving as anchor points or anchors; and/or
    for open spaces, a wireless or cellular communication link with the control server S;

Next, these computing means M make it possible, in a fourth and fifth step, to:
  iv— compute the so-called updated directed acyclic graph (DAG') of movement toward the target places as a function of the nature of the event causing the inaccessibility of certain nodes of the directed acyclic graph (DAG);
  v— snap the actual positions of the users to the digital model and compute the dispatcher node Nd associated with each user and located as near as possible to the actual position of the user;

These computing means M make it possible, in a sixth step, to:
  vi— on the basis of each node of the updated directed acyclic graph, compute for each user a sub-graph DODAG' (Destination Oriented Directed Acyclic Graph) which corresponds to the path personalized to each user, toward a given target place "E", "S", "W".

Finally, these computing means M make it possible, in a seventh step, to:
  vii— repeat the following steps ii to vi, to update the guidance, at a given frequency that is adapted to the event, of the connected objects T in a communication link with the control server S via the communication terminals B, and which guide, via the connected object of the user or connected objects T of the building, by personalized interfaces/signals, each user to follow the associated sub-graph DODAG', toward a given target.

Advantageously, these computing means M compute the sub-graph DODAG', using:
  an "individual objective function" as defined above,
  a "general objective function" as defined above,
  to optimize the waiting lists of all the passage nodes.

The dispatcher nodes Nd can be centroidal points in a space such as a room, a hall, a corridor etc.

The passage nodes can be doors, entrances and exits of lifts, top and bottom points of ramps or stairs etc.

The distinction between dispatcher nodes Nd and passage nodes makes it possible to streamline passings through all the passage nodes of the building for all users.

The connected objects T may be chosen from among the following list:
  Smartphone,
  Connected stick (with vibration device),
  Connected wheelchair,
  Tablet,
  Connected screen,
  Connected visor (RV/RA visor),
  Connected wristband (with vibration device, and screen),
  Connected luminous device,
  Communication devices for security/evacuation officers, Connected robot (fitted with a screen for visual or vocal guidance), Connected drone (fitted with a screen for visual or vocal guidance), The connected objects T may be linked to the control server S with a distinction made between two possible modes: "individual mode" or "group mode".

Wireless communication terminals B may be fixed and/or mobile (on drones, users with sniffers or users who are agents and evacuation assistants).

The connected objects T may have an interface for the users to manually enter the event and information, which are sent to the control server S, in order to determine in the evacuation graph the nearest nodes to the event;

The connected objects T may have means for notifying users of the updating of the path.

The notifications are information messages sent by the server to the connected objects T to inform them of the updates to the evacuation trajectory and/or of the estimated time to evacuate the building. The display of notifications is either textual or graphic, with the new indications on the updated path.

The building can be of any type, for example: an education facility, a mall, a sports facility, a concert hall, a "fan zone".

Example of a Building Chosen as an Illustration

Figure 8:
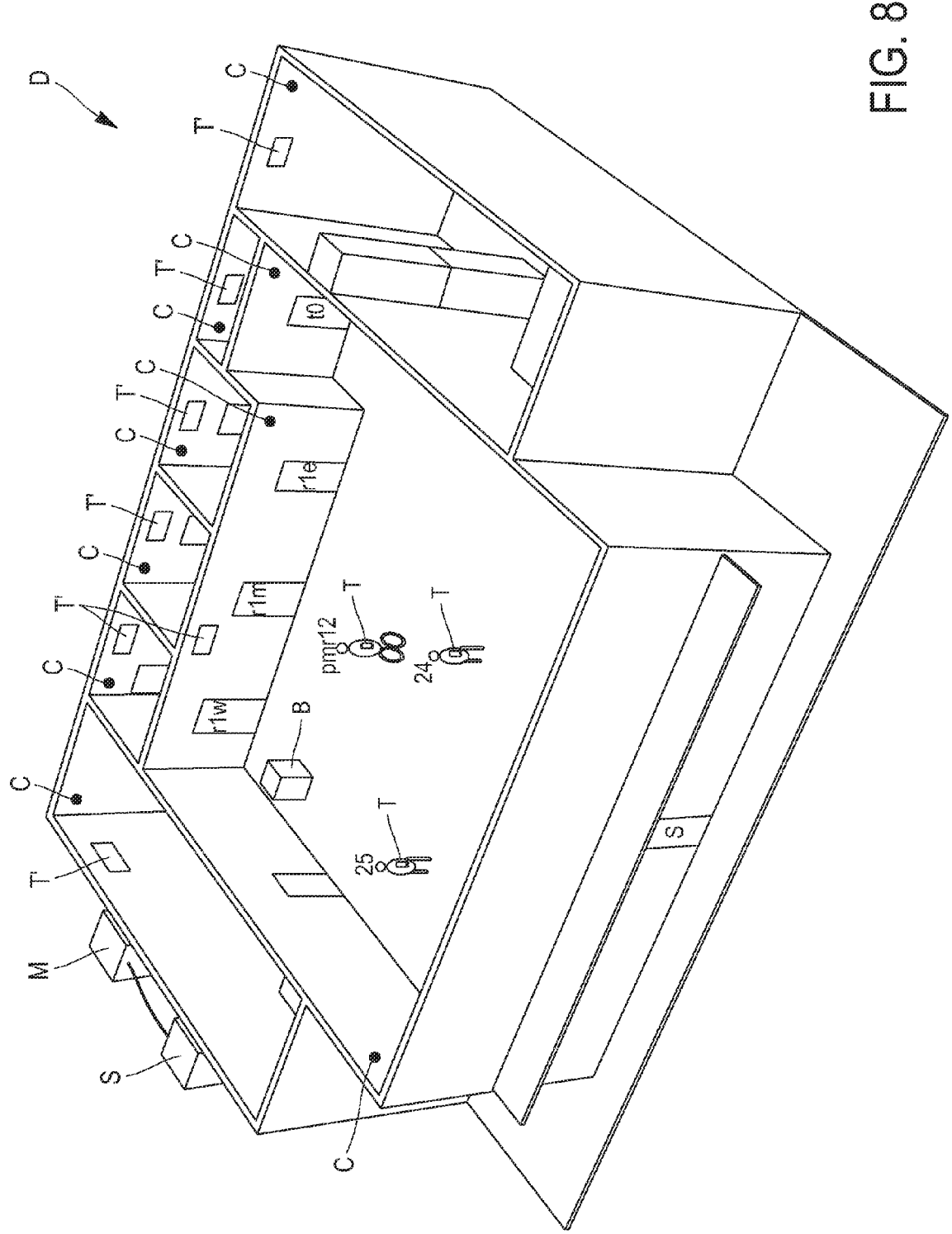
FIG. 8 shows a perspective of the building: view from the South side.
Figure 9:
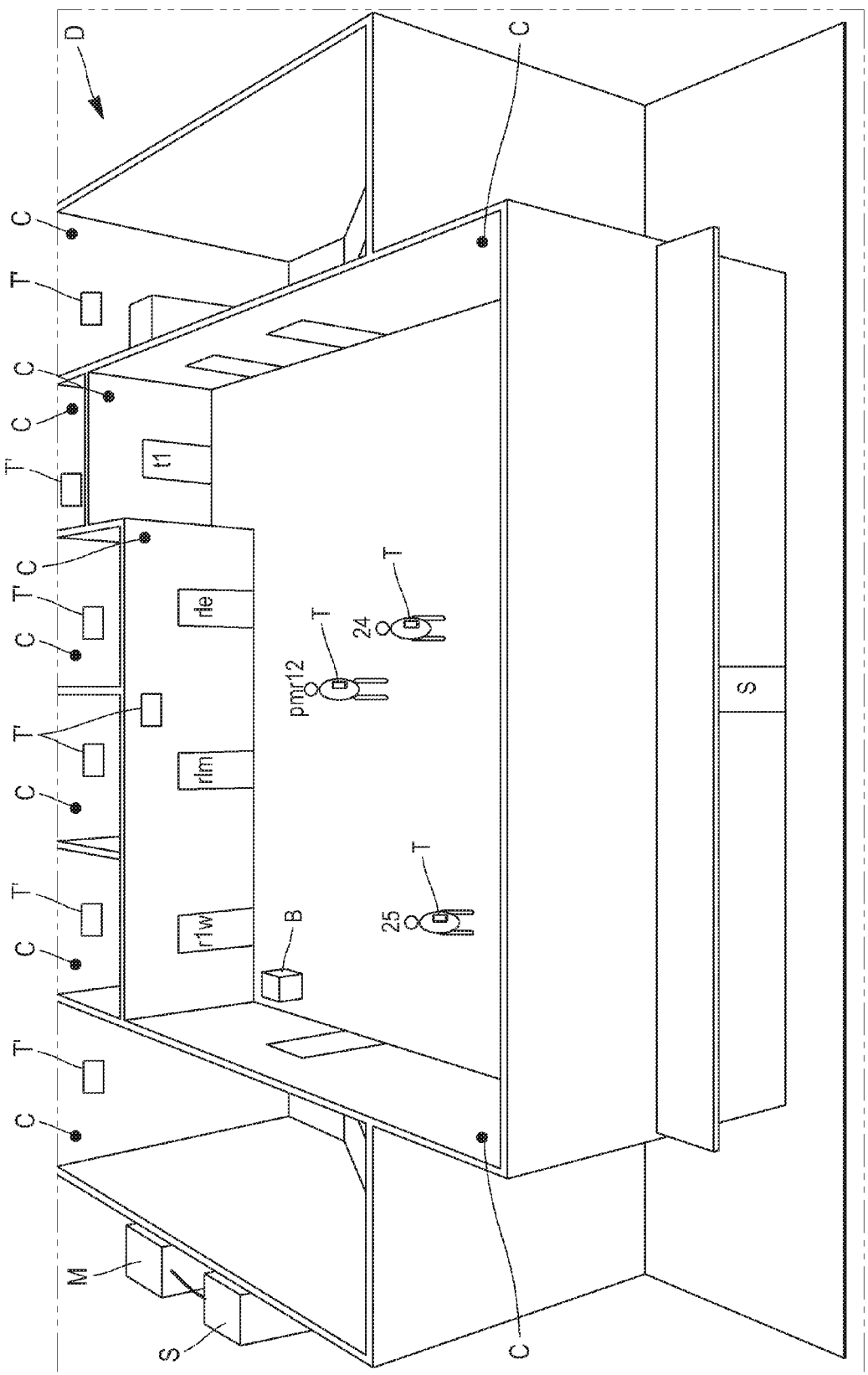
FIG. 9 shows a view of the floor "R1": observer located on the South side.

The building chosen as an illustration consists of:

1. Two floors, see FIG. 8:
   (a) Ground floor, referred to as "R0";
   (b) An upper floor, known as "R1"
2. The floor "R1" contains, see FIG. 9:
(a) 4 rooms referred to as "r1w", "r1m", "r1e" (located, respectively, on the "West", "Middle", "East") and "t1" which serves as technical premises.

Figure 10:
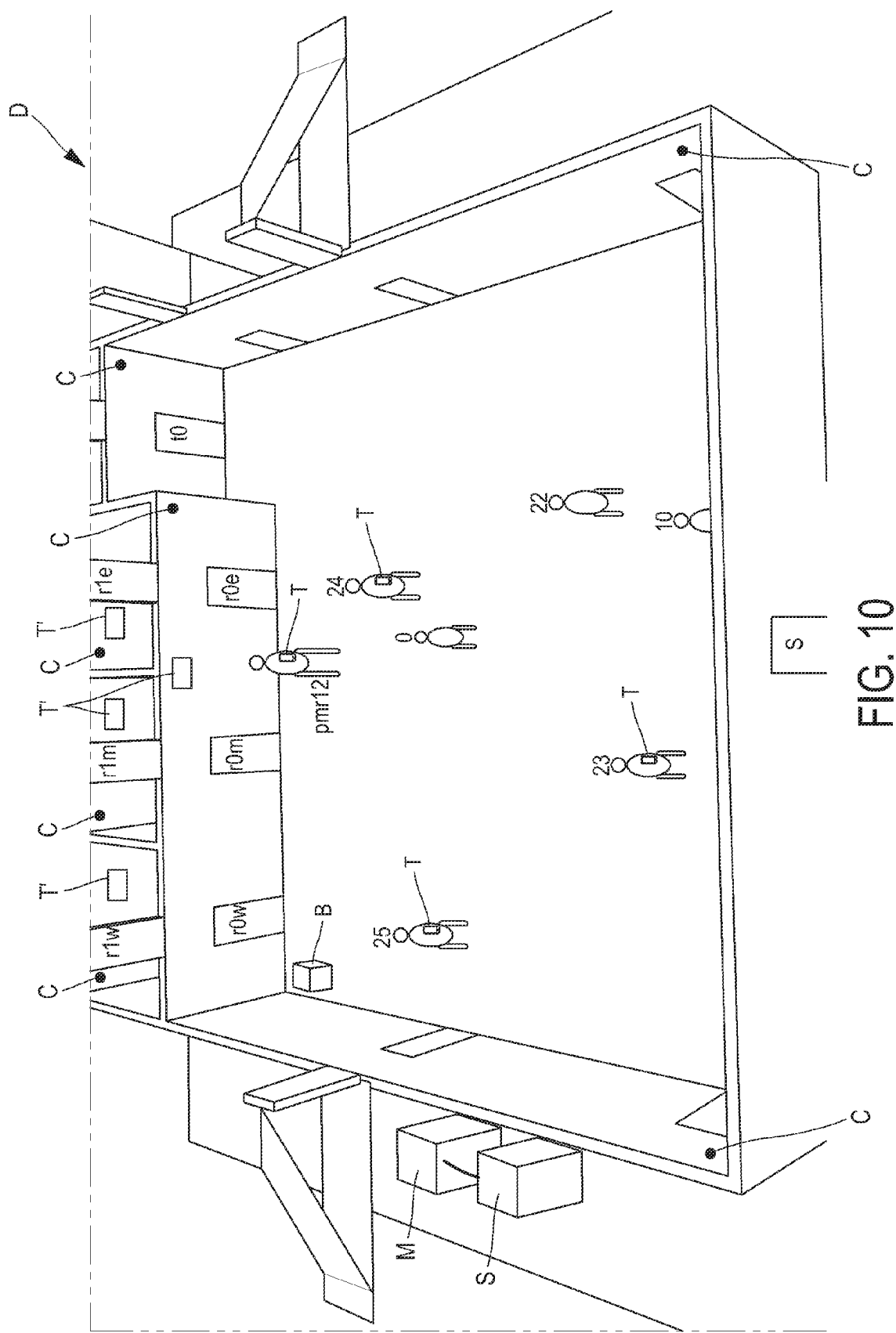
FIG. 10 shows a view of the floor "R0": observer located on the South side.
Figure 12:
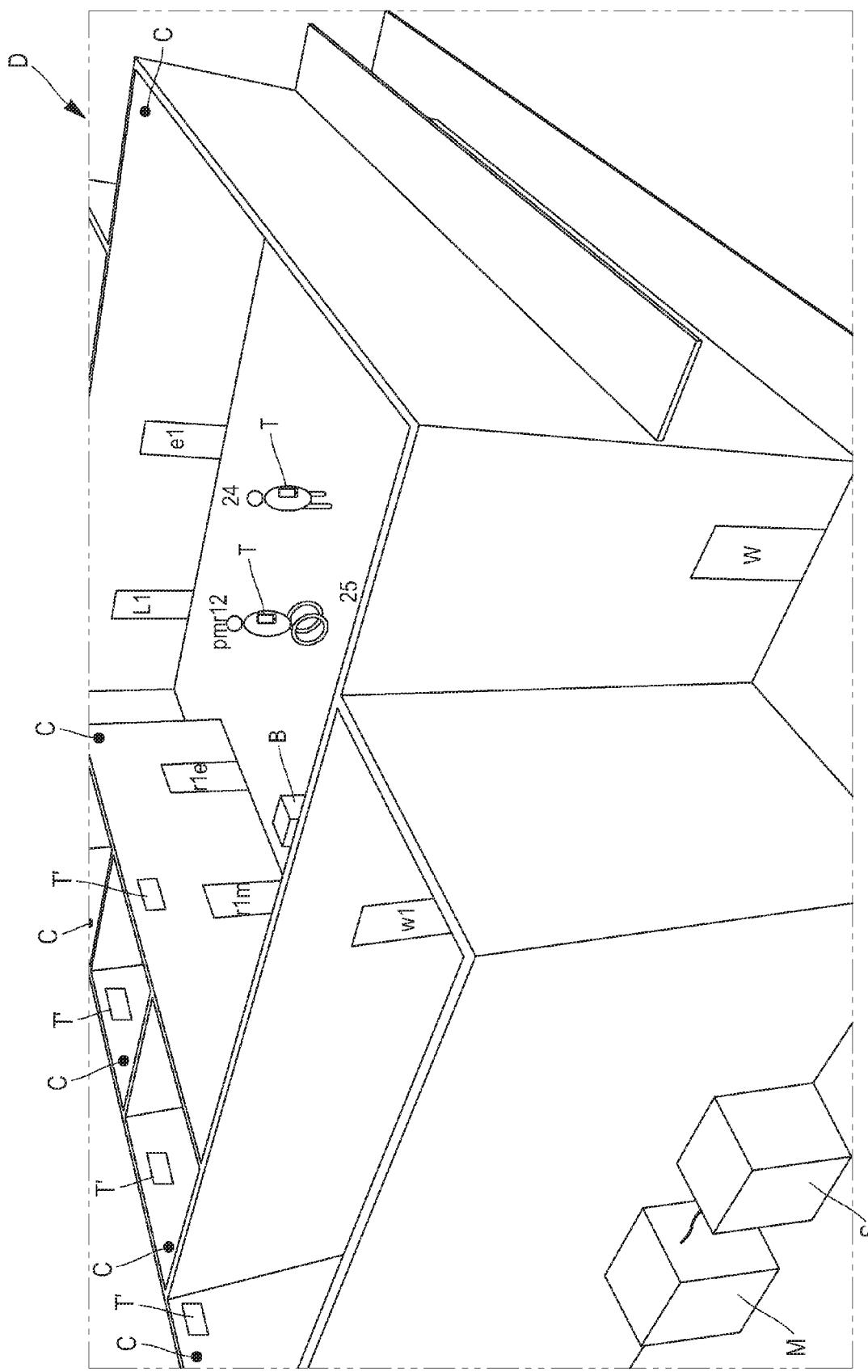
FIG. 12 shows a view of the access doors of the floor "R1" on the ground floor "R0"

From each of the 4 rooms, a door, (on which is registered the name of the room) which gives access to the hall.
(b) A hall which then gives access to the lower level "R0" via 3 possible paths by taking, see FIG. 12:
   i. either the access door "East", referred to as "e1",
   ii. or the access door "West", referred to as "w1",
   iii. or the lift door, referred to as "L1".
3. The "R0" contains, see FIG. 10:
(a) 4 rooms referred to as "r0w", "r0m", "r0e" (located, respectively, on the "west", "Middle", "East" side) and "t0" which is used as a technical room.

Figure 11:
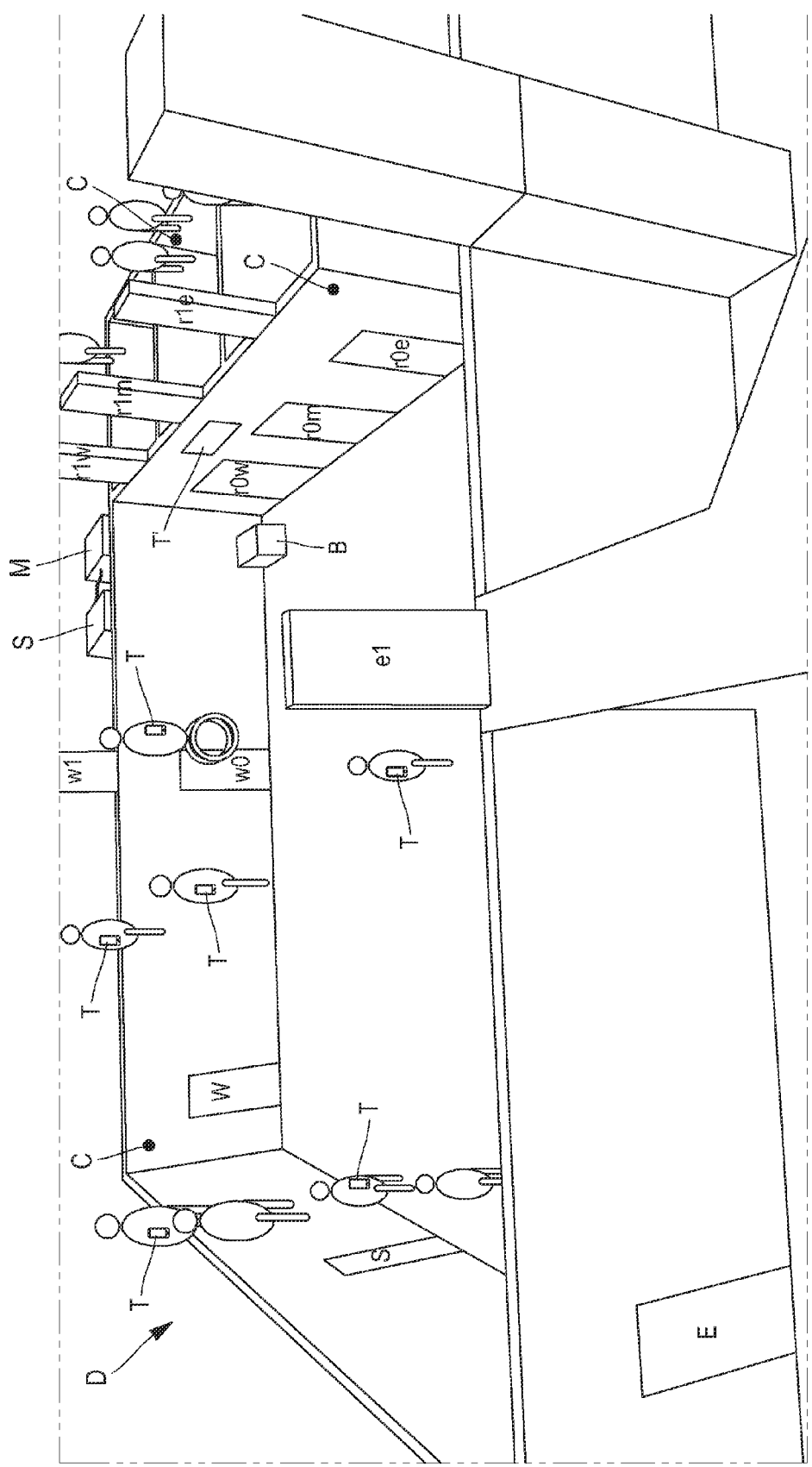
FIG. 11 shows a level "R0": hall and exit doors: observer on the East.
Figure 13:
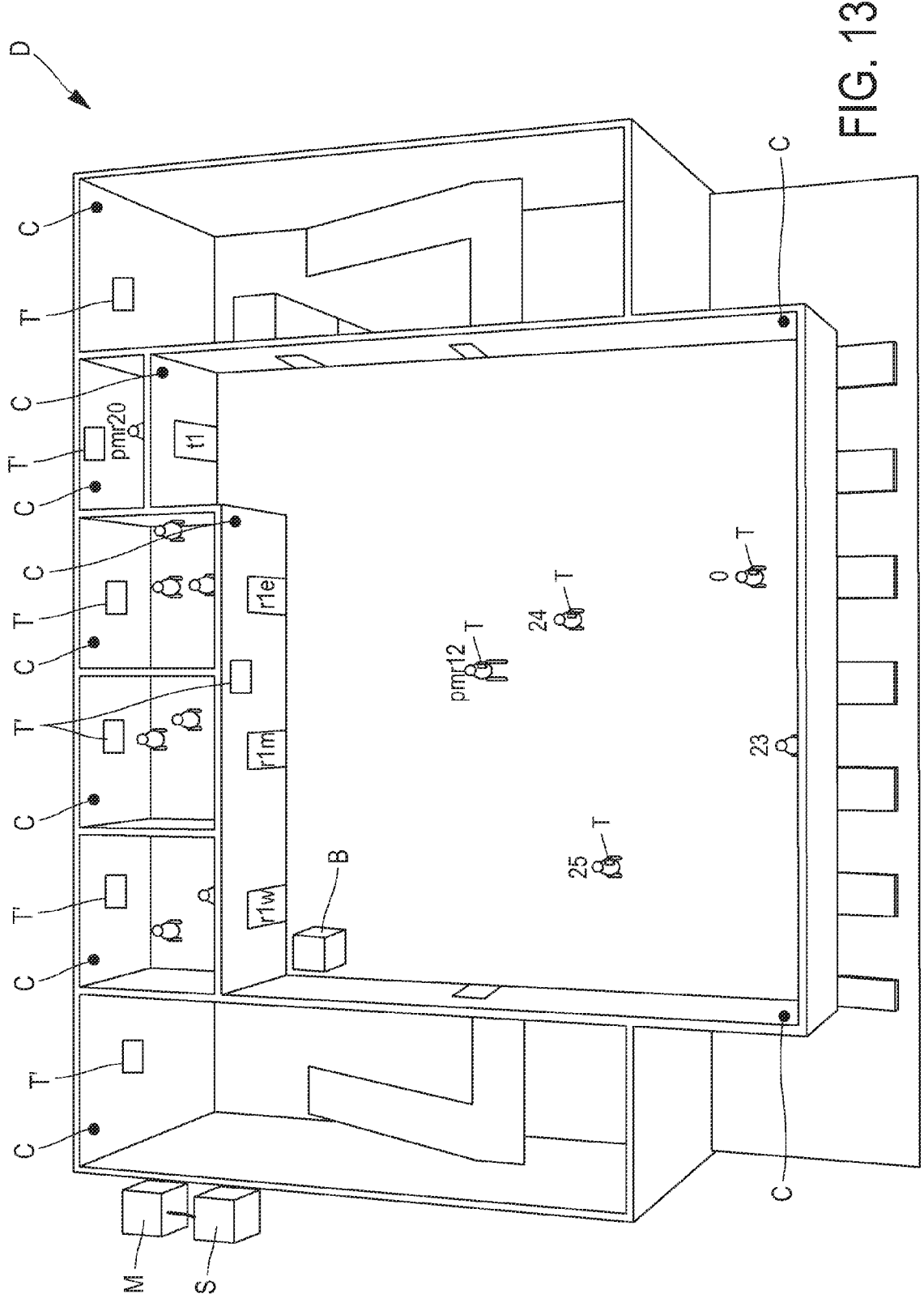
FIG. 13 shows a level "R1": rooms, hall, stairs, lift and corridors.
Figure 14:
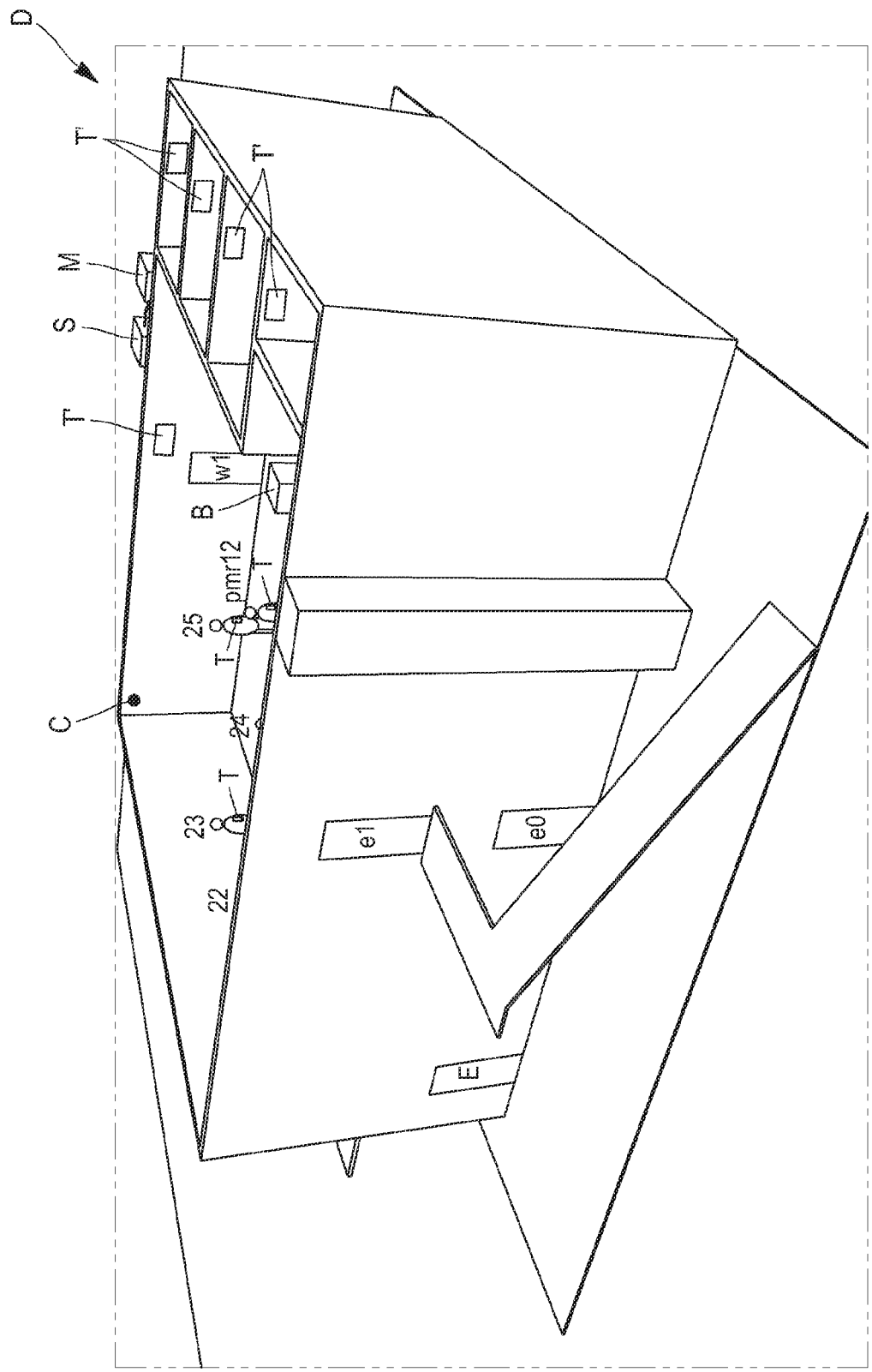
FIG. 14 shows an lift and staircase "East": observer located on side "North-East"
Figure 15:
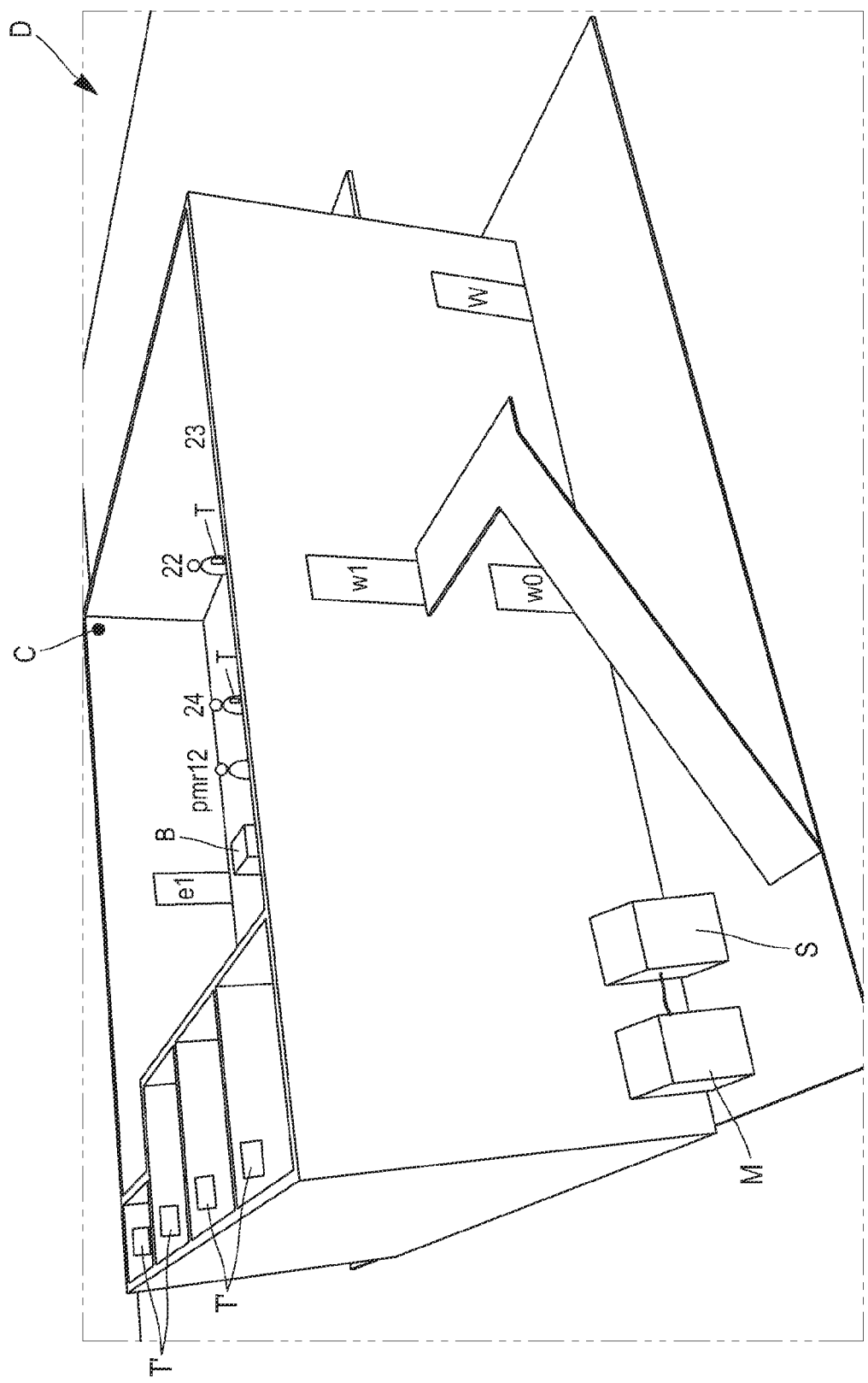
FIG. 15 shows a staircase "West": observer located on side "North-West"
Figure 16:
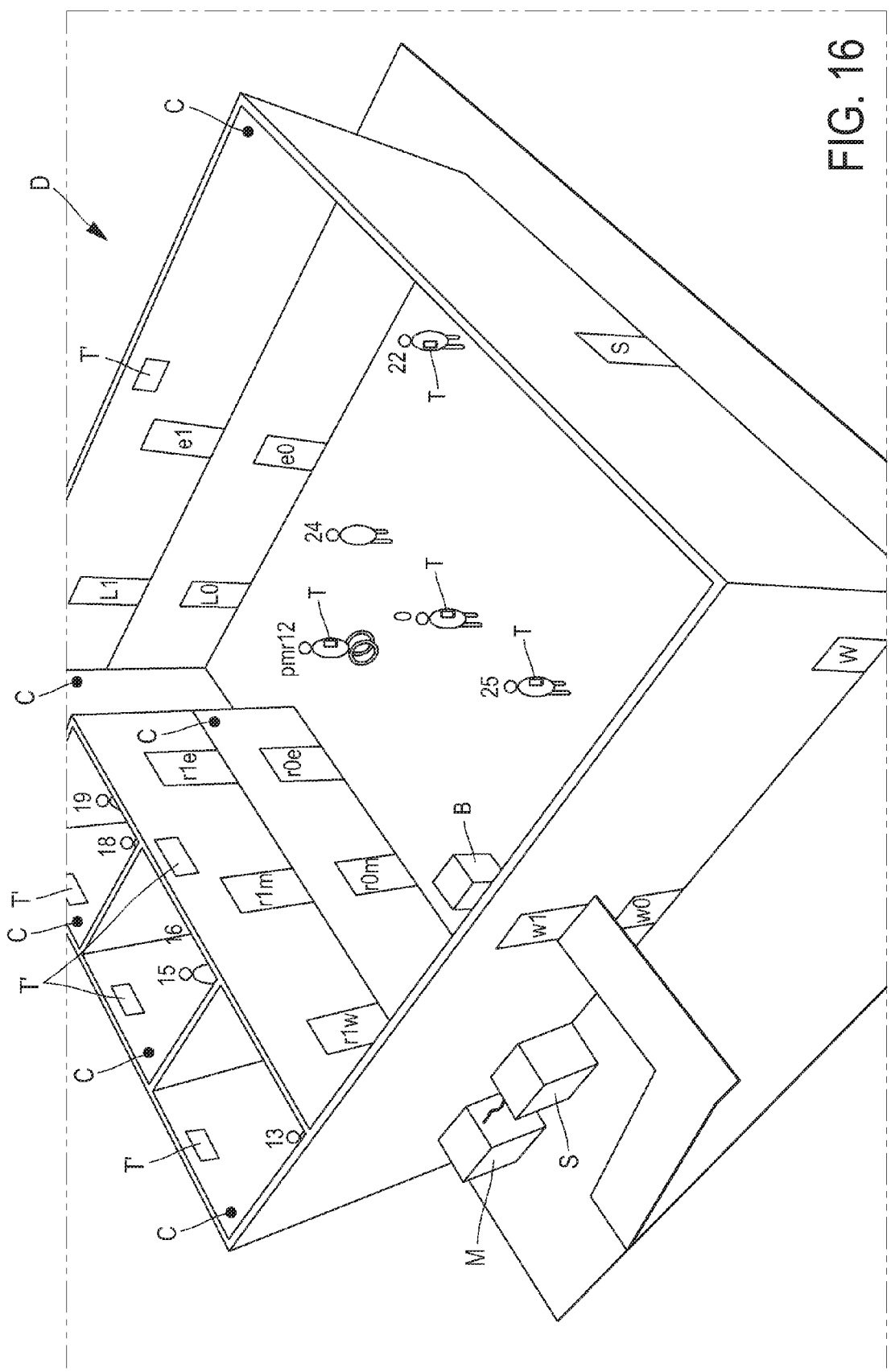
FIG. 16 shows an lift: doors "L1" and "L0" at the levels "R1" and "R0"

From each of the 4 rooms, a door (on which the name of the room is written) gives access to the hall.
(b) A hall which is then used to access the outside of the building by taking, see FIG. 11:
   i. either the exit door "East", referred to as "E",
   ii. or the exit door "West", referred to as "W",
   iii. or the exit door "South", referred to as "S".
4. Two stairs, see FIG. 13:
(a) the stair "East" which is taken by exiting the level "R1" (door "e1") to go back down toward a corridor to the ground floor which opens into the hall of the ground floor by taking the door known as "e0", see FIG. 14;
(b) the stair "West" which is taken by exiting from the level "R1" (door "w1") to go back down to a corridor on the ground floor which opens into the hall of the ground floor by taking the door known as "w0", see FIG. 15;
5. An lift, see FIG. 16:
(a) the door of which, at level "R1", is referred to as "L1";
(b) the door of which, at level "R0", is referred to as "L0".

Extraction of the Nodes and Edges A

Nodes

Figure 17:
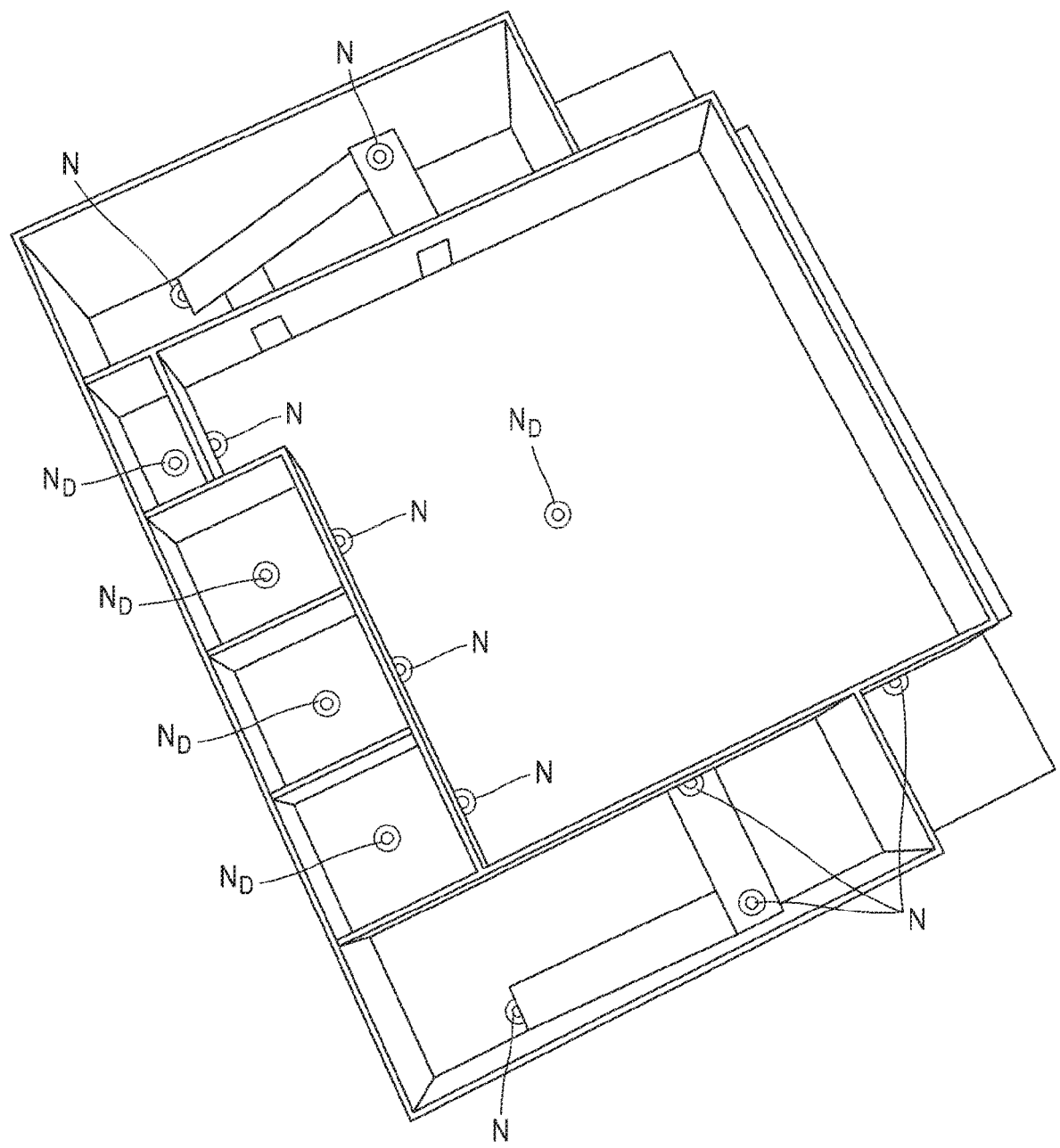
FIG. 17 shows nodes: "virtual" circles on the ground ("R1"+stairs+lift)
Figure 18A:
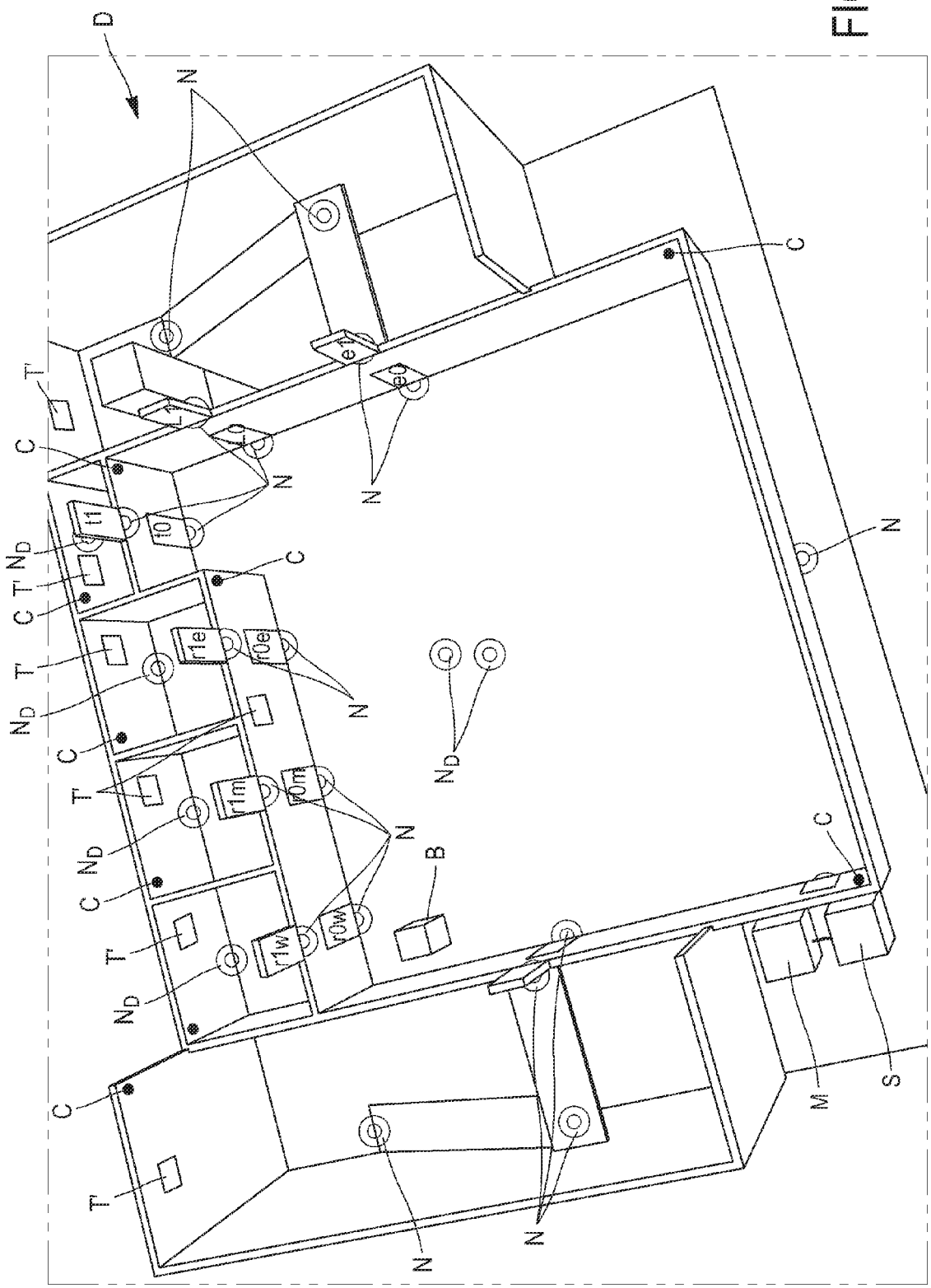
FIG. 18 shows a set of nodes: "R0", "R1", stairs and lifts
(a) Nodes in rooms, stairs, hall, lift and exits ("South" side view);
(b) Summary view of all the nodes of the building ("South-East" side view)
Figure 18B:
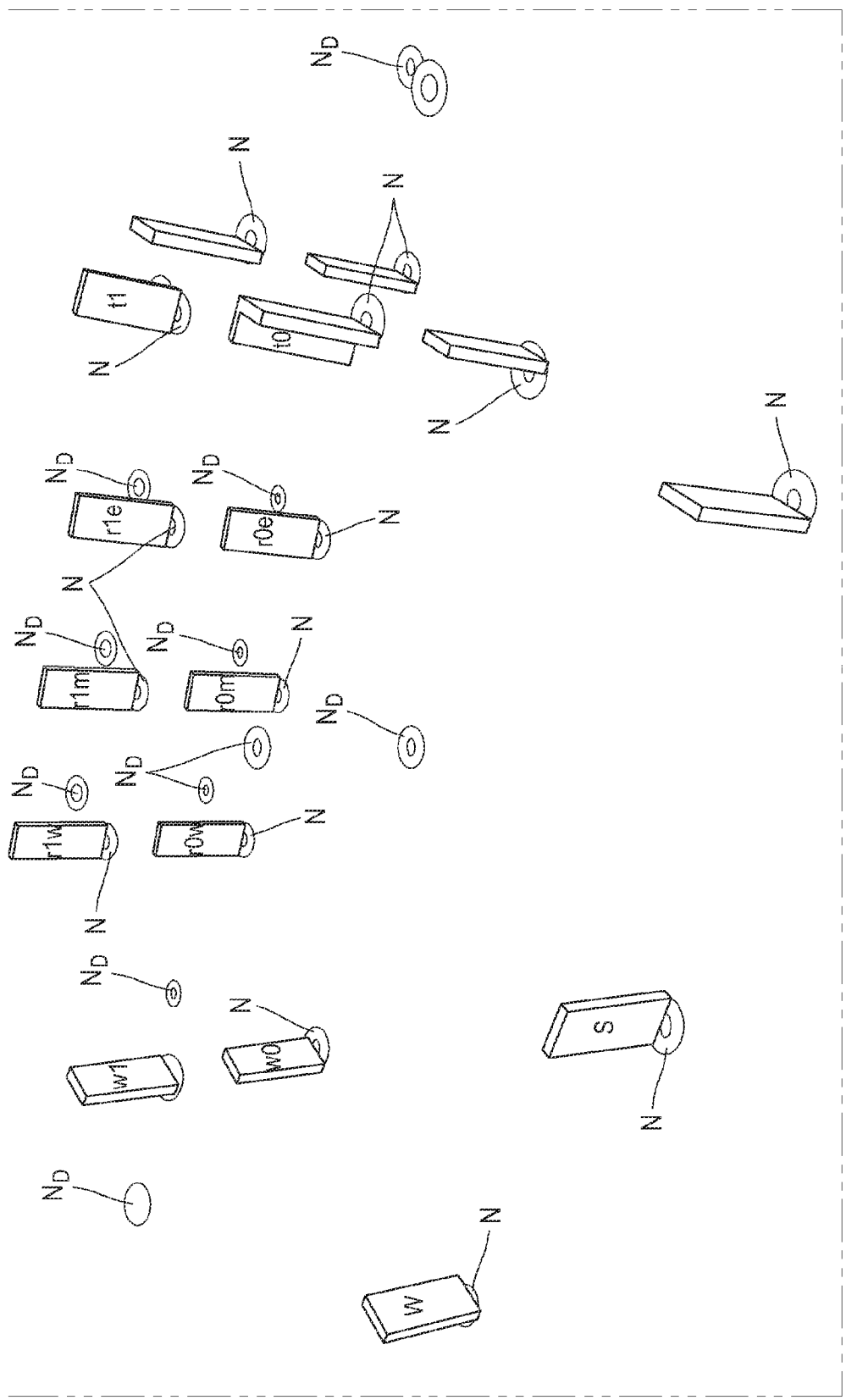

The nodes are "virtual" points. They are of two types, see FIGS. 17-18:
1. dispatcher node Nd: it represents the geometrical center of each of the various halls and rooms; this center is also known as "centroid".
2. passage node, which represents:
   (a) a door sill (room, lift, hall),
   (b) a point at an extremity of the stair landing (top point or bottom point).

Edges A

The edges A, bidirectional links except for special cases, are virtual line segments which link two successive nodes without encountering any obstacles and without loss of visibility.

Figure 19A:
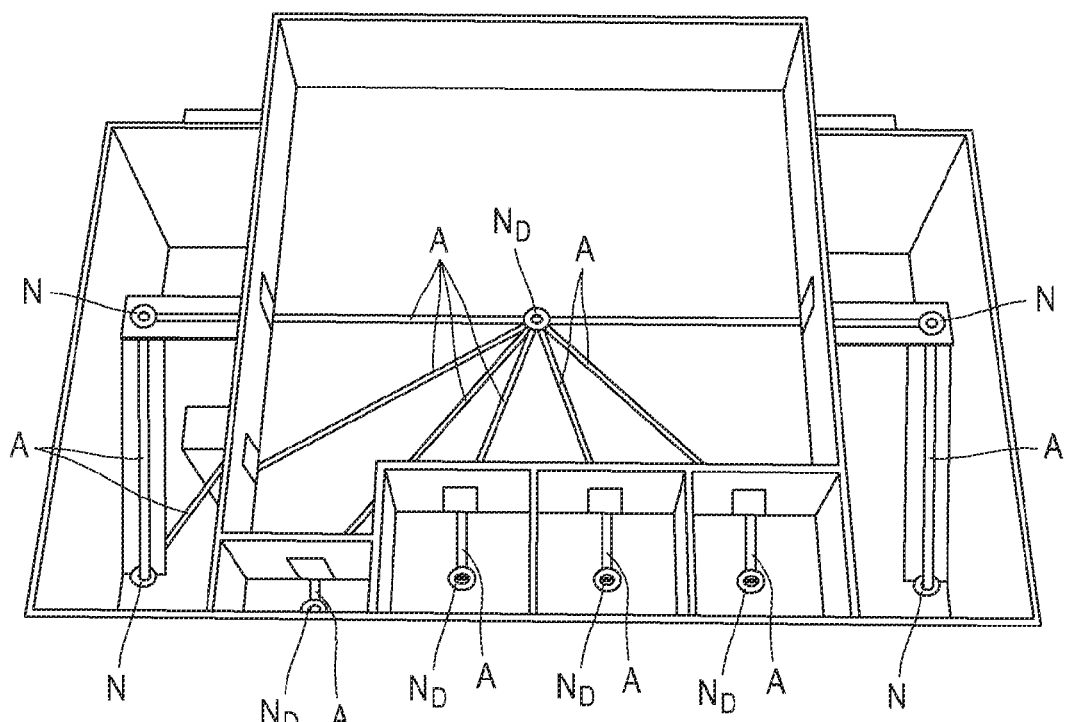
FIG. 19 shows a set of edges: "R0", "R1", stairs and lifts
(a) Edges: segments in rooms, stairs, halls and lift ("North" side view)
(b) Overview of the edges of the building ("South-West" side view)
(c) Overview of the edges of the building ("East" side view)
Figure 19B:
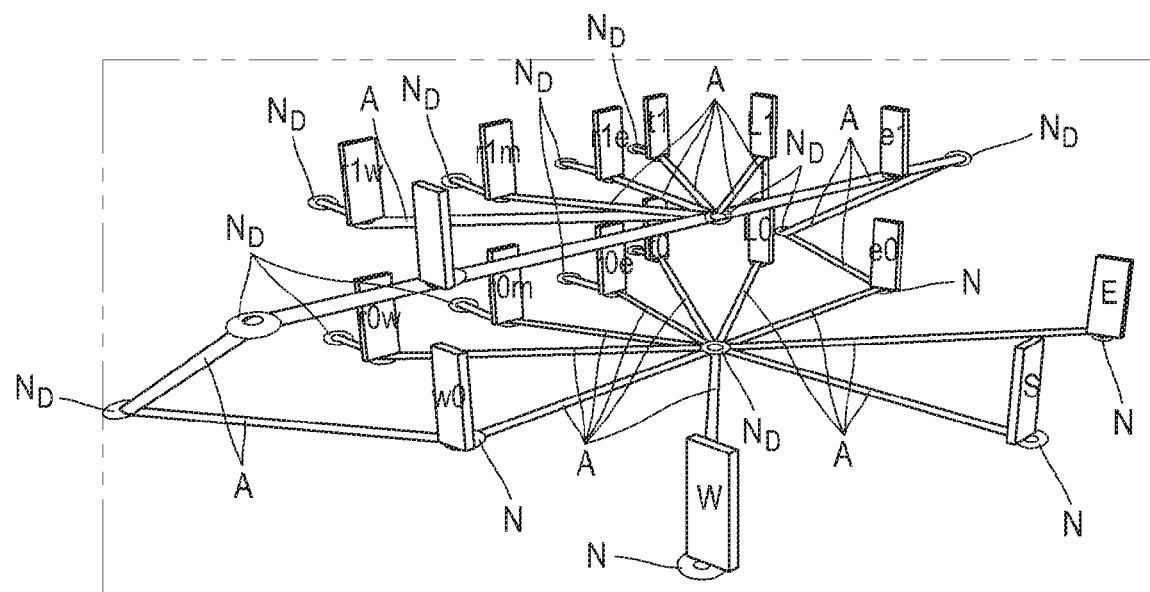
Figure 19C:
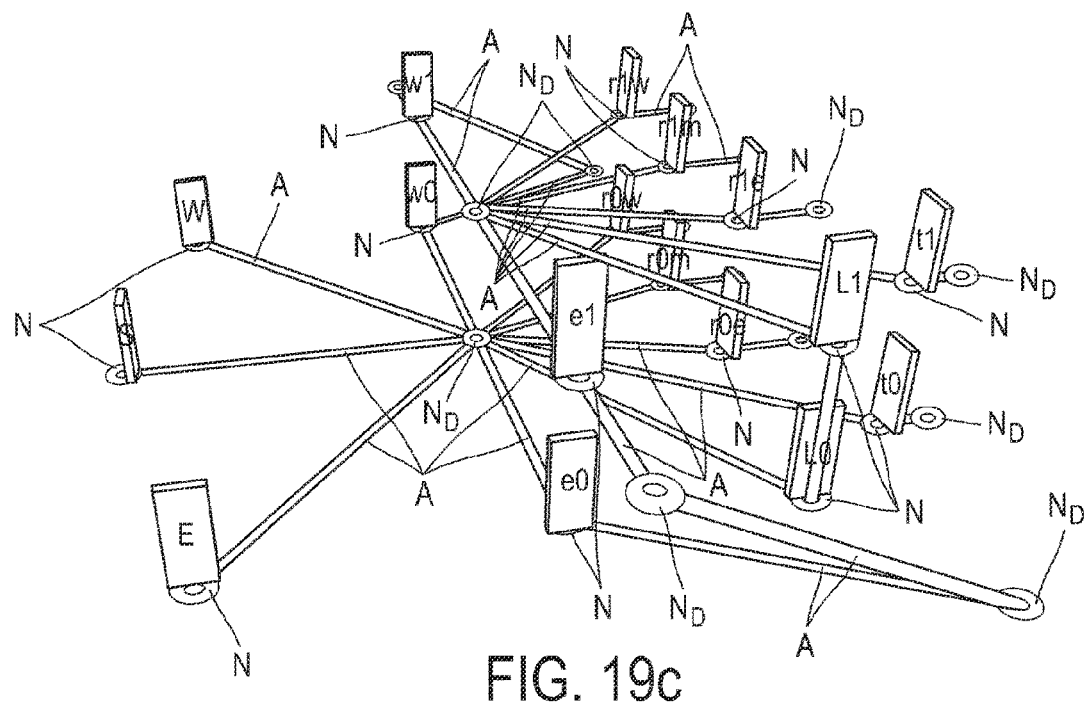

They are defined according to the following methodology, see FIG. 19:
1. "dispatcher node Nd" with a "passage node": the edge links the "centroid" node of a room or a hall to a passage node.
2. "passage node" to "passage node": the edge links the "sill" node of a door to a passage node of a transfer surface.

By way of example, one may consider the following cases, for the transfer surfaces:
(a) sill nodes of the doors from one level to the next, in the case of lifts, for example.
(b) extremity or intermediate nodes of the landings and pilings, in the case of stairs, access ramps or escalators, for example.

NOTE: It should be noted that in reality these transfer surfaces can themselves be defined as spaces (as is the case for corridors), in digital models (BIM or CIM).

In this case, the extreme points (points "top", "bottom", "intermediate") will be considered as "passage nodes" linked to the dispatcher nodes Nds of the intermediate spaces (their centroids).

DAG: Directed Acyclic Graph

Figure 20:
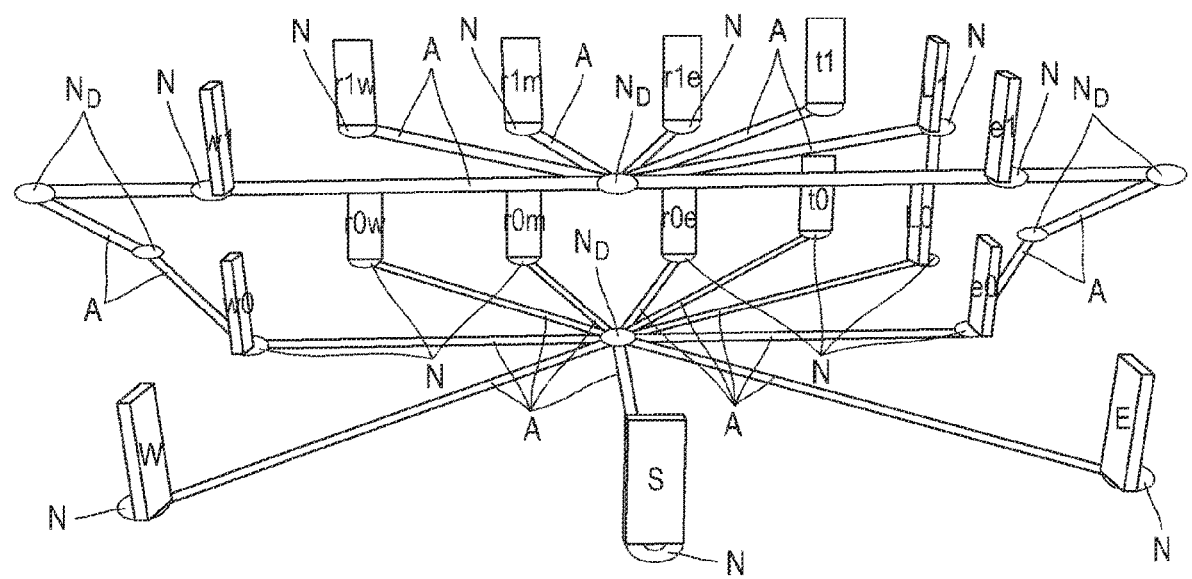
FIG. 20 shows a DAG: graph of evacuation to the exits (view from South side)

The Directed Acyclic Graph (DAG) is defined by the tree entirely composed of the "nodes" and the "edges A" linking them pairwise, see FIG. 20:
1. On the floor "R1", the graph is composed of a sub-graph (sub-DAG "R1"), defined as follows:
(a) at the extremity of the DAG, there are the 4 centroid nodes of the rooms "r1w", "r1m", "r1e" and 11'
(b) 4 edges A link them to the passage nodes (sills of the doors of each of these 4 rooms)
(c) from these 4 door sill nodes start 4 edges A linking them to the dispatcher node Nd (centroid) of the attached hall and communicating with these 4 rooms; it could also be represented by the edges A which would link the 4 sill nodes of the doors directly to the door sill nodes ("East" and "West") and the stair sill node, without passing through the dispatcher node Nd (centroid) of the hall; here the edges A pass through the dispatcher node Nd (centroid) as it has been considered in this example that it was necessary to pass through this dispatcher node Nd;
(d) from this dispatcher node Nd start 3 edges A linking it to 3 doors used to access the level "R0", namely by a transfer via the lift, the stair "East" and the stair "west" via the sill nodes 'e1', 'w1' and 'L1'
2. For the transfer of the floor "R1" to the ground floor "R0", the graph includes a sub-graph (sub-DAG "R1 to R0"), defined as follows:
(a) each door sill node of the stair ("East" and "West") is linked by an edge to an extreme node of the upper landing (b) each extreme node of the upper landing is linked by an edge to an extreme node of the bottom of the stair (lower landing)
(c) each bottom node is linked by an edge to a sill node of the access door to the hall of the "R0" level.
(d) the sill node of the lift door (level R1) is linked by an edge to the sill node of the lift door (R0 level).

3. At the "R0" level, the graph is composed of a sub-graph (sub-DAG), defined as follows:
(a) at the extremity of the DAG, there are the 4 centroid nodes of the rooms "r0w", "r0m", "r0e" and "t0"
(b) 4 edges A link them to the passage nodes (sills of the doors of each of these 4 rooms)
(c) from these 4 door sill nodes and of the 3 access doors from the level "R1" (nodes "e0", "w0" and "L0") start the 7 edges A linking them to the dispatcher node Nd (centroid) of the adjoining hall and communicating with these 4 rooms and the transfer doors from the level "R1" by the sill nodes 'e1', 'w1' and 'L1'; it could also be represented by the edges A which would link the 4 door sill nodes directly to the door sill nodes ("E", "S" and "W") and the stair sill node, without passing through the dispatcher node Nd (centroid) of the hall; here the edges A pass through the dispatcher node Nd (centroid) since it has been considered in this example that it was necessary to pass through this dispatcher node Nd (centroid);
(d) from this dispatcher node Nd start 3 edges A linking it to the 3 sill nodes of the doors ("E", "S", "W") making it possible to leave the building.

Users: Associated Dispatcher Nodes Nds

Figure 21:
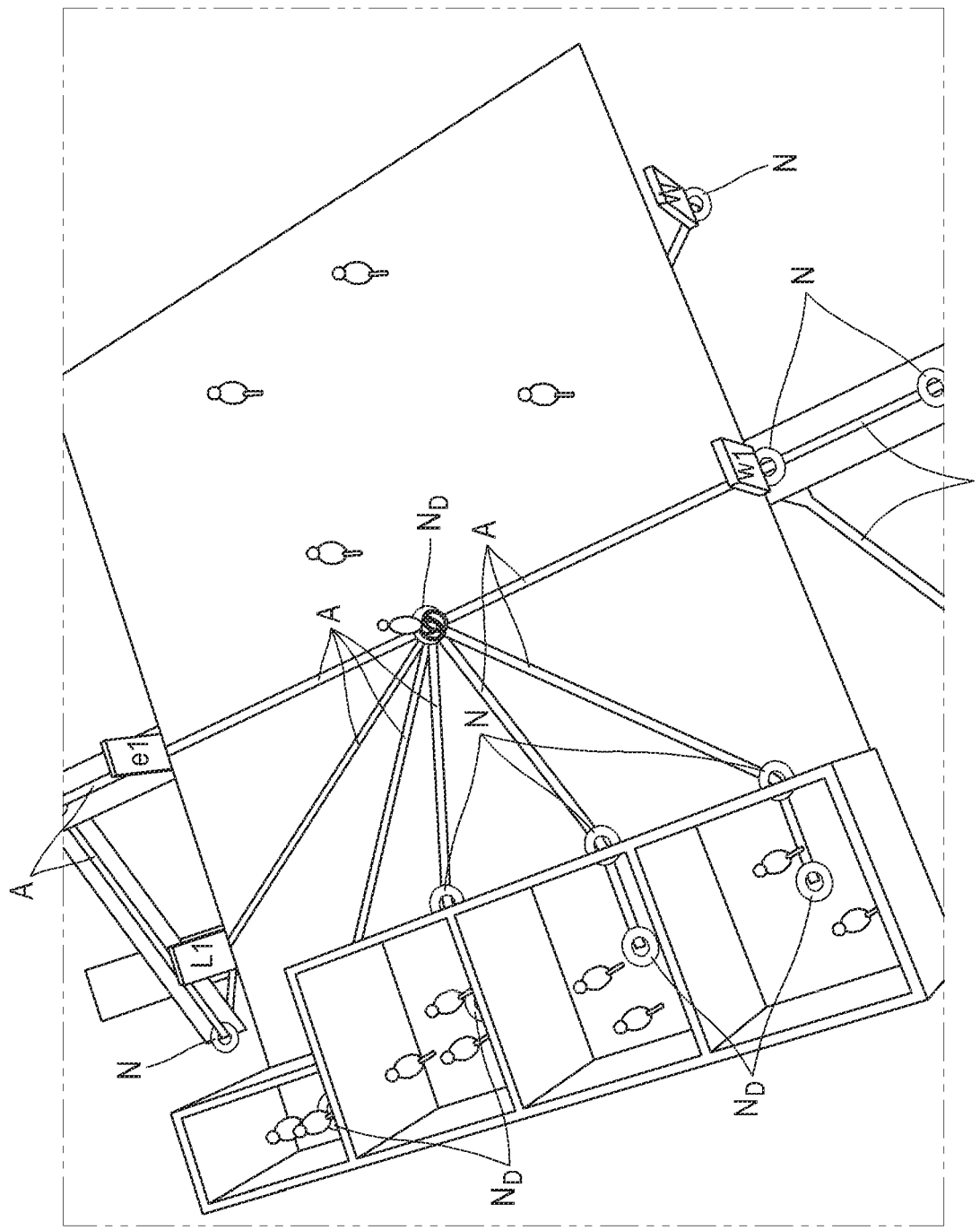
FIG. 21 shows users at the level "R1" of the building (view from West side)
Figure 22:
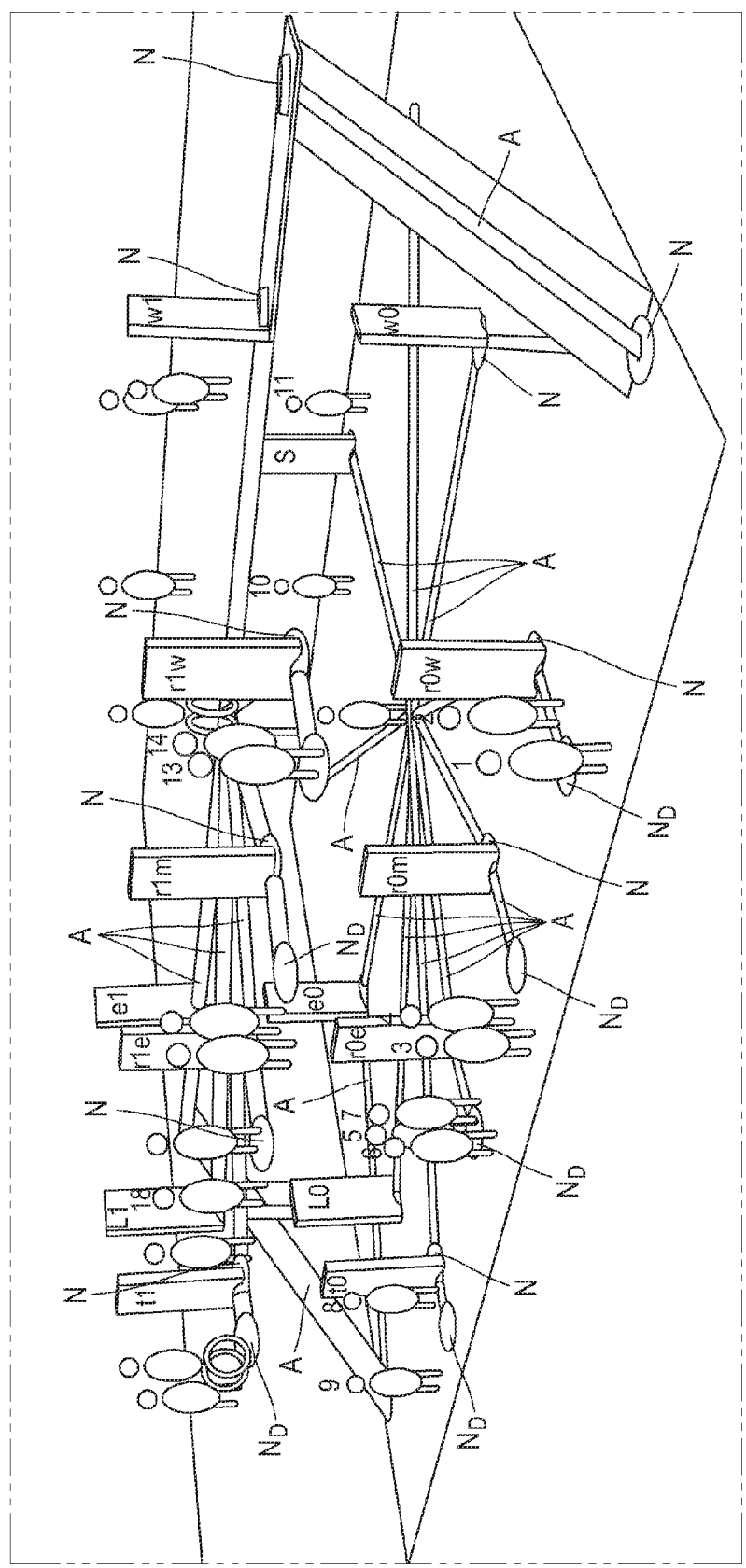
FIG. 22 shows users at the level "R0" of the building (view from North-West side)

As an illustration, various users (USAGERS) including PMR (People with Reduced Mobility) are arbitrarily positioned in the building, see FIG. 22. Hence, their position being located in a space (room, hall, corridor), they are then associated with the dispatcher node Nd (centroid) of this space, i.e.:

1. On the floor "R1", the users are identified in the positions illustrated in FIG. 21:
(a) the two people currently in the room "r1w", being located there, are associated with the dispatcher node Nd (centroid) of this room "r1w".
(b) the two people currently in the room "r1m", being located there, are associated with the dispatcher node Nd of this room "r1m".
(c) the three people currently in the room "r1e", being located there, are associated with the dispatcher node Nd of this room "r1e".
(d) the two people, including one person with reduced mobility, currently in the room "t1", being located there, are associated with the dispatcher node Nd of this room "t1".
(e) the five people, including one person with reduced mobility, currently in the hall of this floor, being located there, are associated with the dispatcher node Nd of this hall space.

2. On the floor "R0", the users are identified in the positions illustrated in FIG. 22:
(a) the two people currently in the room "r0w", being located there, are associated with the dispatcher node Nd (centroid) of this room "r0w".
(b) the two people currently in the room "r0m", being located there, are associated with the dispatcher node Nd of this room "r0m".
(c) the three people currently in the room "r0e", being located there, are associated with the dispatcher node Nd of this room "r0e".
(d) the two people currently in the room "t0", being located there, are associated with the dispatcher node Nd of this room "t0".
(e) the three people currently located in the hall of this floor, being located there, are associated with the dispatcher node Nd of this hall space.

DODAG': DAG Specifically Directed at Each User

As a reminder, the DAG concerns the overall building: a "nodes N, Nd-edges A" graph. It depends on the architecture (distribution of the spaces): it describes the paths from any place of the building to the exits.

The DODAG', specific to each user, is a portion thereof (a dynamic sub-graph), starting from the current position (user), to guide the user toward the best possible exit (optimal guidance according to the user profile and the crowds present), see Table 1:

1. for the users, of the 4 rooms on the floor "R1", the evacuation requires them to be guided, first, to the nearest passage nodes ("door sill" node of their room). They hence access the space adjoining the hall of the level "R1" ("hall R1"). Their path will then be similar to those already present in this "hall R1", i.e. people with reduced mobility (or with authorization to take certain accessways); they take the lift (passage node "L1"), while "non-RMPs" can take the lift or one of the stairs ("East": passage node "e1", or "West": passage node "w1"). Routed via the lift or the stairs, they come out into the "hall R0", via the passage nodes ("L0", "e0" or "w0" according to the path taken to get to the ground floor). They must then be directed to one of the exit doors ("E", "S" or "W"), according to how congested the waiting lists of these 3 doors are.

2. Similarly, the users of the 4 rooms (level R0) access the "door sill" nodes (passage node) of their room to thus access the hall of the level R0" (known as the "hall R0"). They must then be directed to one of the 3 exits ("E", "S" or "W"), according to how congested their waiting lists are.

TABLE 1

Compilation of the DODAG' specific to each of the users

| Floor | Space | User | Assigned to centroid (space) | Layer 1 (wait list) of node (door) | Relay assigned to centroid (space) | Layer 2 (wait list) total (door) |
|---|---|---|---|---|---|---|
| R1 | r1w | P: 13, 14 | (r1w) | (r1w) | (hall R1) | (L1, e1, w1) |
|  | r1m | P: 15, 16 | (r1m) | (r1m) | (hall R1) | (L1, e1, w1) |
|  | r1e | P: 17, 18, 19 | (r1e) | (r1e) | (hall R1) | (L1, e1, w1) |
|  | t1 | Pmr: 20 | (t1) | (t1) | (hall R1) | (L1) |
|  | t1 | P: 21 | (t1) | (t1) | (hall R1) | (L1, e1, w1) |
|  | hall R1 | Pmr: 12 | (hall R1) | (L1) | (stairs, lift) | (L0) |
|  | hall R1 | P: 22, 23, 24 | (hall R1) | (L1, e1, w1) | (stairs, lift) | (L0, e0, w0) |

TABLE 1-continued

Compilation of the DODAG' specific to each of the users

| R0 | r0w | P: 1, 2 | (r0w) | (r0w) | (hall R0) | (E, S, W) |
|---|---|---|---|---|---|---|
| | r0m | P: 3, 4 | (r0m) | (r0m) | (hall R0) | (E, S, W) |
| | r0e | P: 5, 6, 7 | (r0m) | (r0e) | (hall R0) | (E, S, W) |
| | t0 | P: 8, 9 | (t0) | (t0) | (hall R0) | (E, S, W) |
| | hall0 | P: 0, 10, 11 | (hall R0) | (E, S, W) | Evacuated | Evacuated |

(a) Waiting lists at the passage nodes: layer (1) then transfer to layer (2)

| User | Layer 1 (wait list) of node (door) | Layer 2 (wait list) total (door) | Relay assigned to centroid (space) | Layer 3 (wait list) total (door) | Relay assigned to centroid (space) | Layer 4 (wait list) total (door) |
|---|---|---|---|---|---|---|
| P: 13, 14 | (r1w) | (L1, e1, w1) | (stairs, lift) | (L0, e0, w0) | (hall R0) | (E, S, W) |
| P: 15, 16 | (r1m) | (L1, e1, w1) | (stairs, lift) | (L0, e0, w0) | (hall R0) | (E, S, W) |
| P: 17, 18, 19 | (r1e) | (L1, e1, w1) | (stairs, lift) | (L0, e0, w0) | (hall R0) | (E, S, W) |
| Pmr: 20 | (t1) | (L1) | (lift) | (L0) | (hall R0) | (E, S, W) |
| P: 21 | (t1) | (L1, e1, w1) | (stairs, lift) | (L0, e0, w0) | (hall R0) | (E, S, W) |
| Pmr: 12 | (L1) | (L0) | (hall R0) | (E, S, W) | Evacuated | Evacuated |
| P: 22, 23, 24 | (L1, e1, w1) | (L0, e0, w0) | (hall R0) | (E, S, W) | Evacuated | Evacuated |
| P: 1, 2 | (r0w) | (E, S, W) | Evacuated | Evacuated | Evacuated | Evacuated |
| P: 3, 4 | (r0m) | (E, S, W) | Evacuated | Evacuated | Evacuated | Evacuated |
| P: 5, 6, 7 | (r0e) | (E, S, W) | Evacuated | Evacuated | Evacuated | Evacuated |
| P: 8, 9 | (t0) | (E, S, W) | Evacuated | Evacuated | Evacuated | Evacuated |
| P: 0, 10, 11 | (E, S, W) | Evacuated | Evacuated | Evacuated | Evacuated | Evacuated |

(b) Waiting lists at the passage nodes: layers (1), (2) total. to (3) and (4)

Waiting Lists and Optimal Guided Evacuation

On the basis of the DODAG's, compiled for each user (see Table 1), the waiting lists of the passage nodes are then compiled from the nodes furthest from the DAG (rooms of level "R1") all the way to the target nodes (("E", "S", "W")):

1. The waiting lists of the target nodes are compiled, on the basis of the positions of the users present in the hall "R0" (users associated with the dispatcher node Nd of the space: "hall R0"). Layer 1 of these lists then contains the list of people and their position, in terms of distance to reach the door.

To simplify understanding, a virtual checkerboard with a (50 cm×50 cm) grid is projected onto the surface of the floorboards. The users are placed at the centers of the checkerboard cells.

Figure 23:
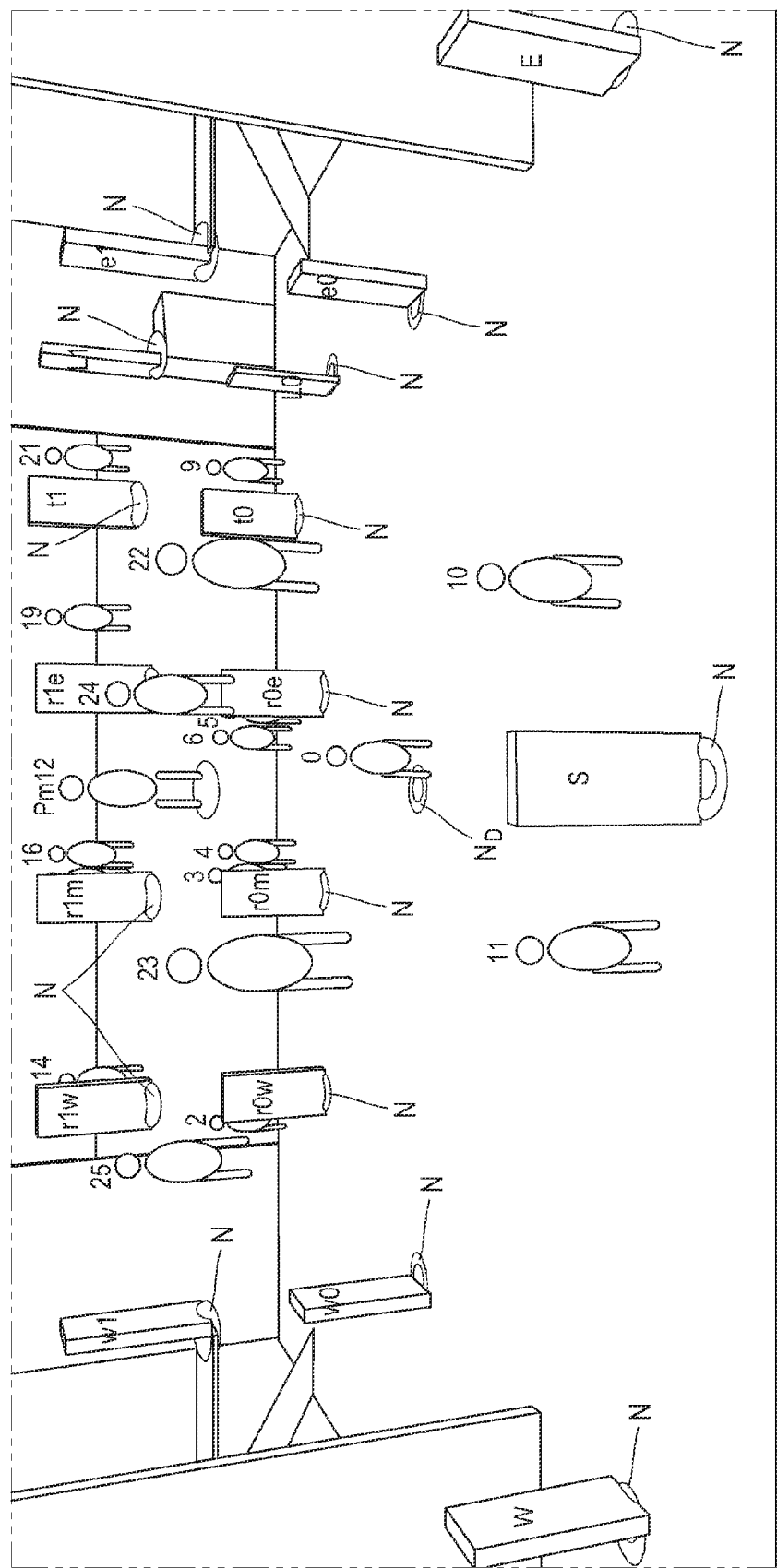
FIG. 23 shows a waiting list of the exit doors: position along the shortest distance to the door: view from "South" side.

Their distance to the exit door can be expressed in terms of the number of squares separating the user of the door, in order to facilitate the illustration thereof, see FIG. 23:

(a) Door "E":
waitList(E)=[P0: 27cases]; [P10: 12cases]; [P11: 20cases] (1)

(b) Door "S":
waitList(S)=[P0: 18cases]; [P10: 7cases]; [P11: 5cases] (2)

(c) Door "W"
waitList(W)=[P0: 30cases]; [P10: 21cases]; [P11: 13] (3)

2. For the other users, they must first be able to access the hall ("hall R0") in order to then be associated with the centroid node of the hall and be able to be transferred to the waiting lists of the 3 exit doors (since they are adjoining the "hall R0"). Specifically, this centroid inherits the waiting lists of the adjoining passage nodes, namely the nodes (door sills):

(w0), (r0w), (r0m), (r0e), (t0), (L0) and (e0).

Figure 24:
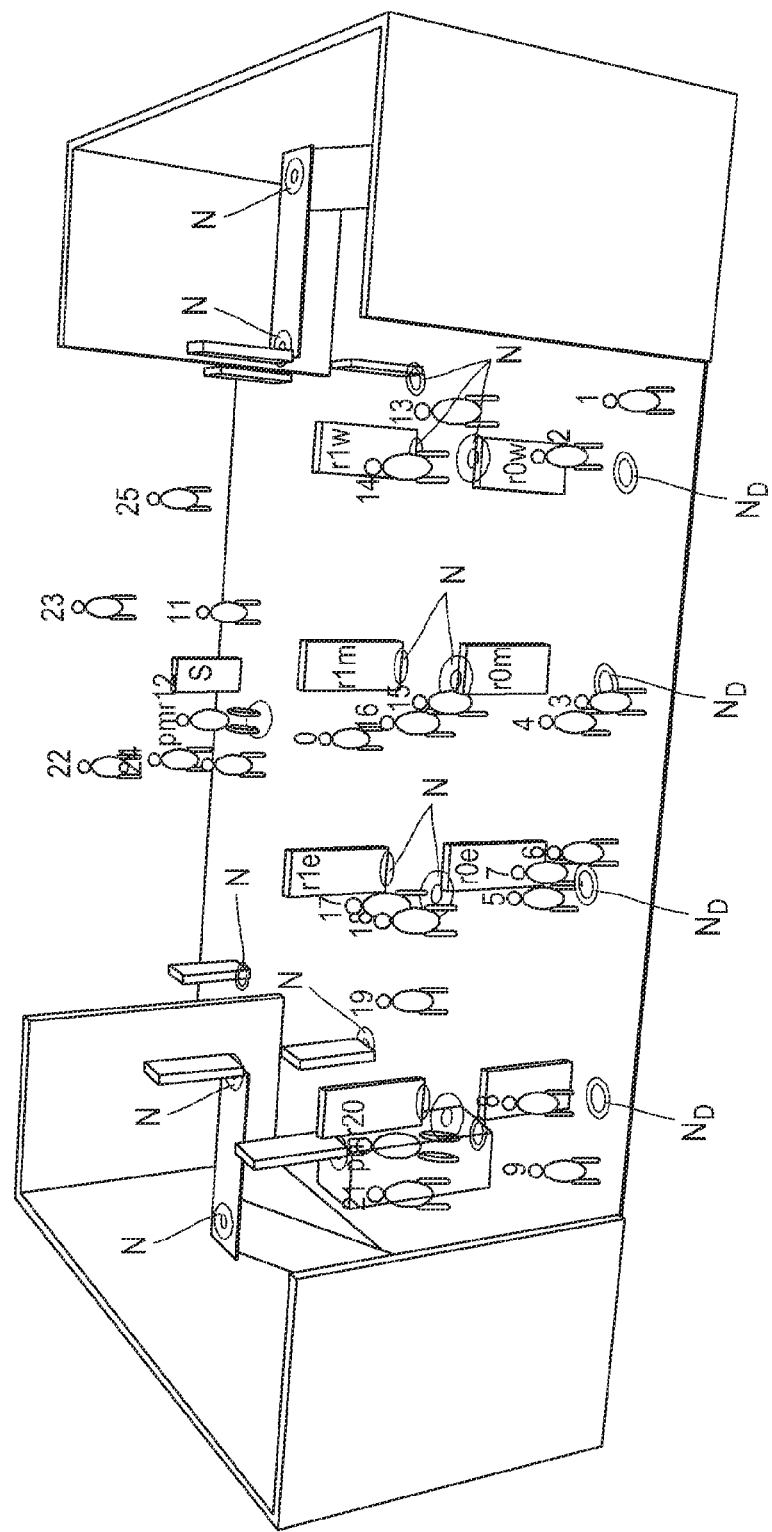
FIG. 24 shows a waiting list of the passage nodes (door sill) of the rooms "r1w", "r1m", "r1e", "t1": view from "North" side.

For the 3 exit doors ("E", "S", "W"), they thus inherit the lists of the upper layers (layers 2 and above). These lists are compiled as follows, see FIG. 24:

(a) door "w0": inherits the waiting list of the node of the door (w1), from the floor "R0", the layer of the rank immediately above it (b) door "r0w":
waitList(r0w)=[P1: 8cases]; [P2: 2cases] (4)

(c) door "r0m":
waitList(r0w)=[P3: 6cases]; [P4: 5cases] (5)

(d) door "r0e":
waitList(r0w)=[P5: 3cases]; [P6: 6cases]; [P7: 3cases] (6)

(e) door "t0":
waitList(r0w)=[P8: 0case]; [P9: 4cases] (7)

(f) door "L0": inherits the waiting list of the node of the door (L1), from the floor "R1", the layer of the rank immediately above it, (g) door "e0": inherits the waiting list of the node of the door (e1), from the floor "R1", the layer of the rank immediately above it.

Figure 25:
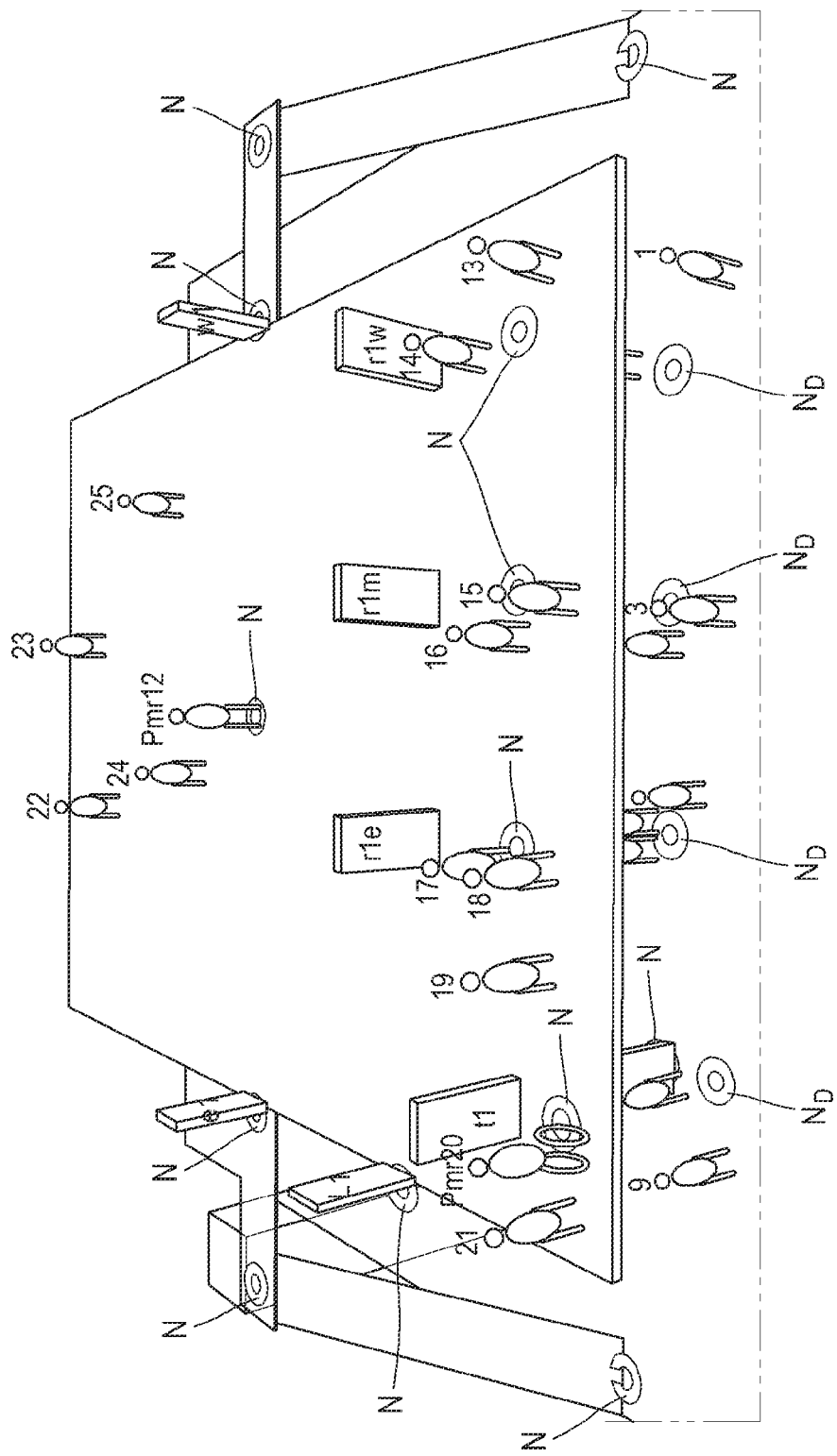
FIG. 25 shows a waiting list of the passage nodes (door sill) of the rooms "R1": view from "North" side.

NOTE: It should be noted that these lists of passage nodes are transmitted, by inheritance, to those of the 3 exit doors. The distance (number of squares) from the current position of the user to the exit door is obtained by adding the distance between the node of the door (of the room, for example "r0w") to the exit door (for example, exit 3. Starting from the exit doors (as the lowest level in terms of layers in the waiting lists), the furthest layers would be those that will be inherited from the nodes (door sills) of the rooms of the floor "R1"), see FIG. 25:

(a) stair "w0": inherits the waiting list of the node of the door (w1), from the floor "R1", the layer of the rank immediately above it (b) door "r1w":
waitList(r1w)=[P13: 6cases]; [P14: 2cases] (8)

(c) door "r1m":
waitList(r1m)=[P15: 6cases]; [P16: 5cases] (9)

(d) door "r1e":
waitList(r1e)=[P17: 3cases]; [P18: 5cases]; [P7: 8cases] (10)

(e) door "t1":
waitList(t1)=[Pmr20: 2cases]; [P21: 4cases] (11)

Implementation of the Waiting List Optimization Algorithm

Once the various waiting lists of the passage nodes have been compiled, the users are stored according to the distance to the intermediate passage nodes in question, which ordered lists are inherited from nearest neighbor to nearest neighbor via the passage nodes all the way to the exit doors of the building or the withdrawal areas and shelters (case of people with reduced mobility, for example, who must go to the areas that are specially furnished and dedicated to them).

In order to show the performance of the developed algorithm and the subject of the claims of this invention, two examples have been chosen as an illustration.

Figure 26:
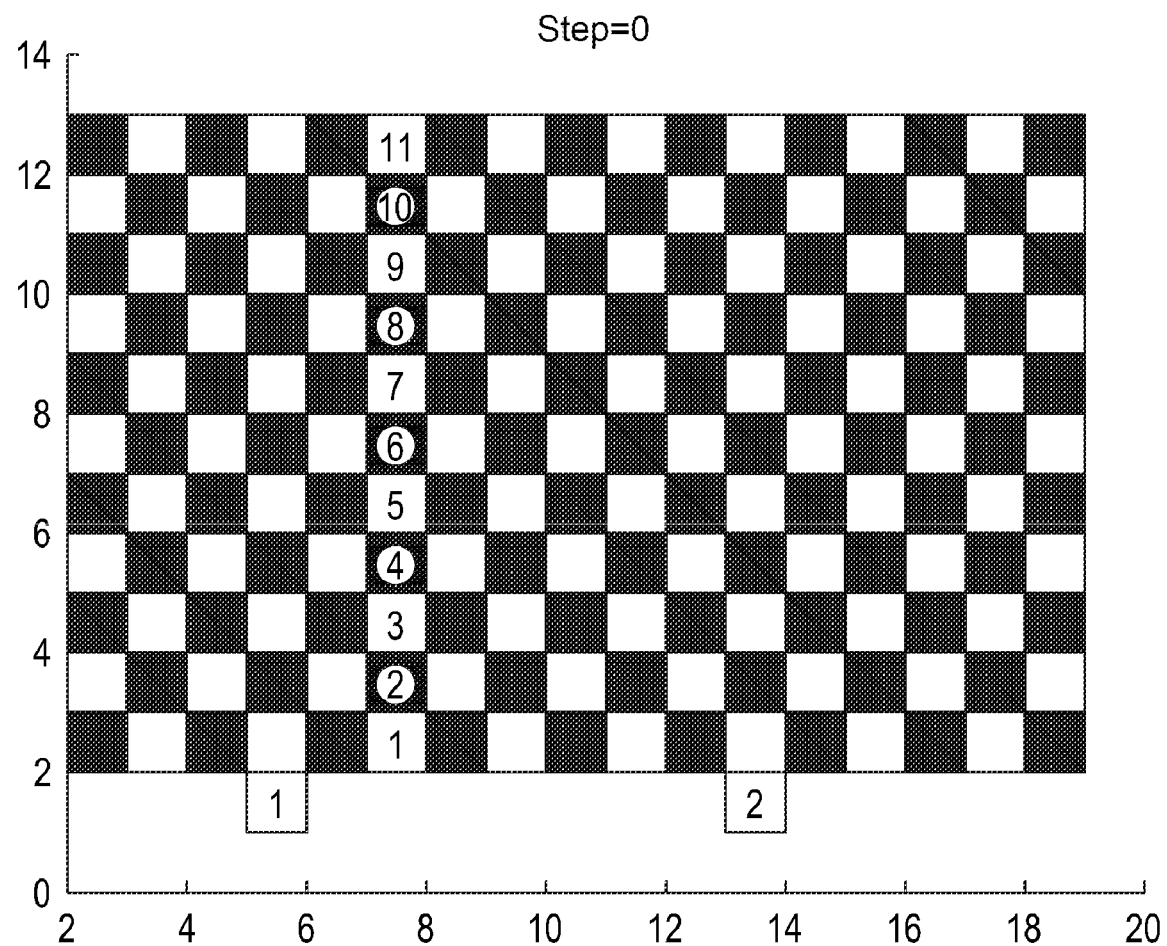
FIG. 26 shows a room containing 02 exits known as "1" and "2", and containing 11 people "P:1" to "P:11"

Specifically, two meeting rooms have been chosen with two particular configurations, to provide evidence of the performance of the developed algorithm:

1. Extraction Scenario in "Zip" Form, See FIG. 26.
(a) By the criterion of the shortest distance between the user and the doors, it would be the door "1" that would receive the users.
(b) The assumption is made that one must, in movement, always leave an empty square between two users (to avoid collisions). It is also assumed that the displacement speed is uniform (in general: an average of 1.2 m/s, at normal pace).
(c) 3 time increments would then have been needed to evacuate the person "P:1" then "((1+1)·10 remaining people" time increment, so a total of 23 increments (one square per time increment).
(d) By managing the waiting lists of the 2 doors in an optimized manner, the complete evacuation time is reduced to 17 time increments, the waiting lists being defined as follows, see FIG. 26:

$$\begin{Bmatrix} \text{User} & \text{Door: 1} & \text{Door: 2} \\ 1 & 3 \text{ increments} & 7 \text{ increments} \\ 2 & 4 & 8 \\ 3 & 5 & 9 \\ 4 & 6 & 10 \\ 5 & 7 & 11 \\ 6 & 8 & 12 \\ 7 & 9 & 13 \\ 8 & 10 & 14 \\ 9 & 11 & 15 \\ 10 & 12 & 16 \\ 11 & 13 & 17 \end{Bmatrix}$$

It should be recalled that each user will occupy, in the reordered list of each door, the maximum position between its own, before rearrangement, and the position of the user preceding it to which are added two positions (which must observe an empty cell to avoid collisions with the preceding user of the list). It will be assigned to the list where it will occupy the lowest rank between the two lists.

Figure 27:
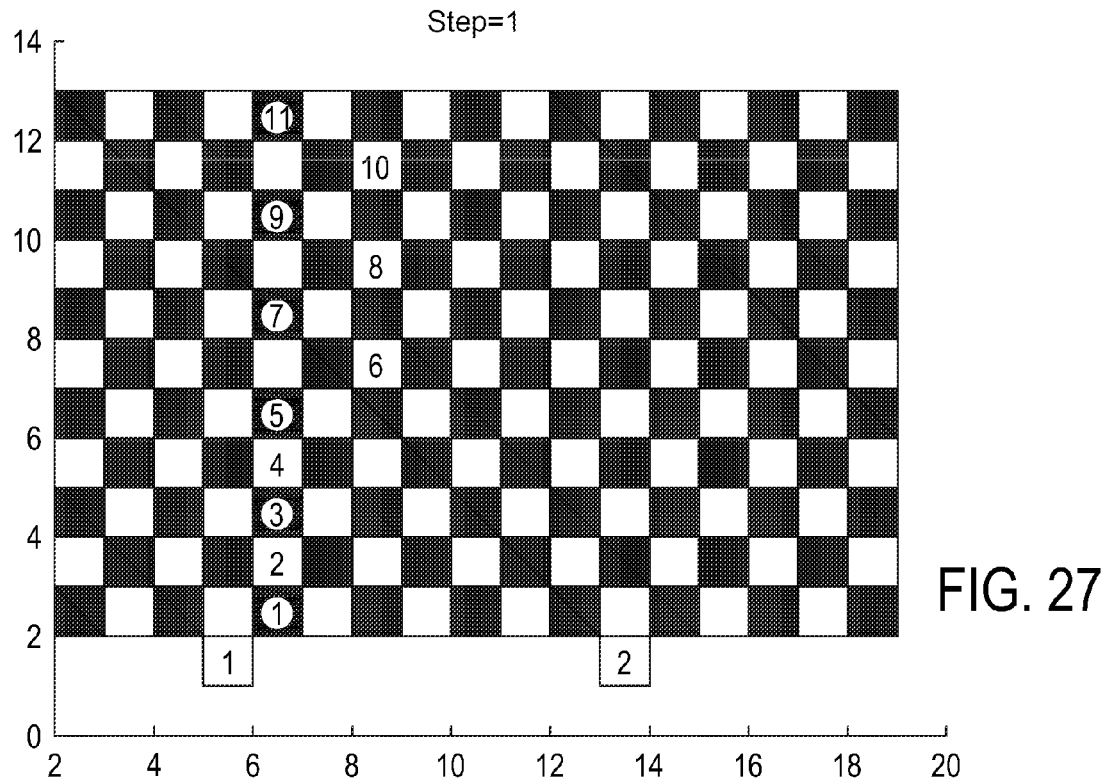
FIG. 27 shows intermediate phases during the evacuation.
Figure 28:
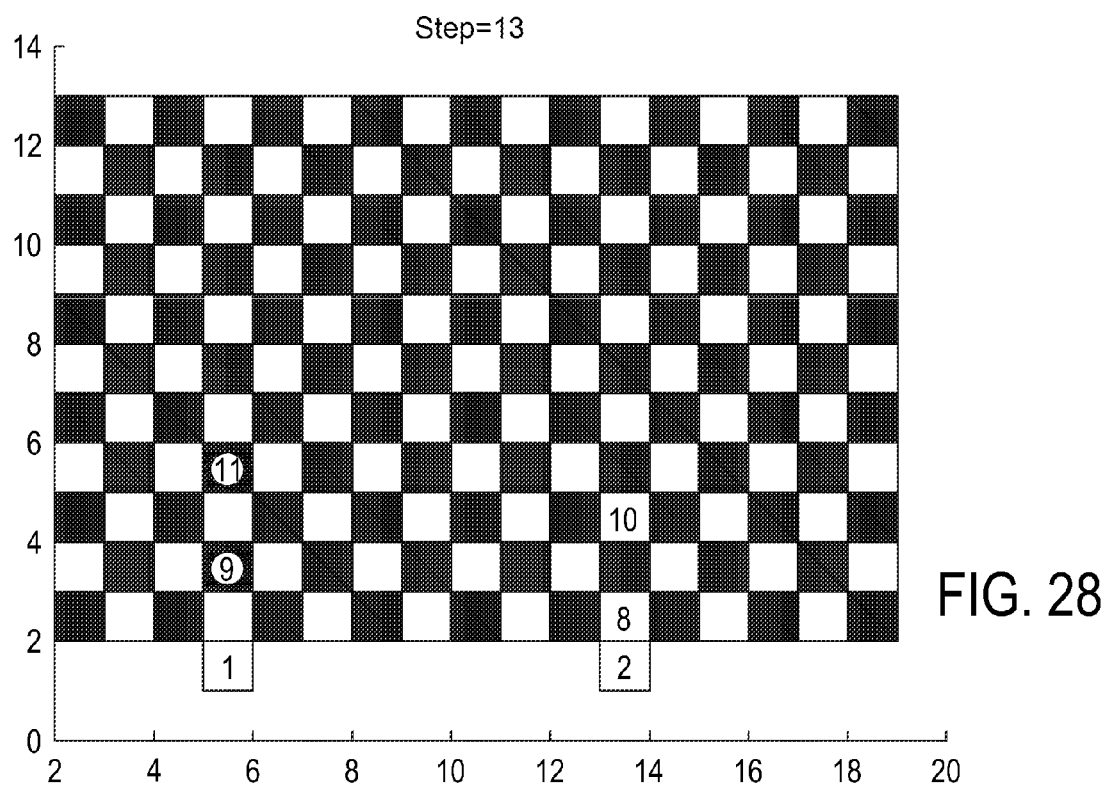
FIG. 28 shows the last users in evacuation.
Figure 29:
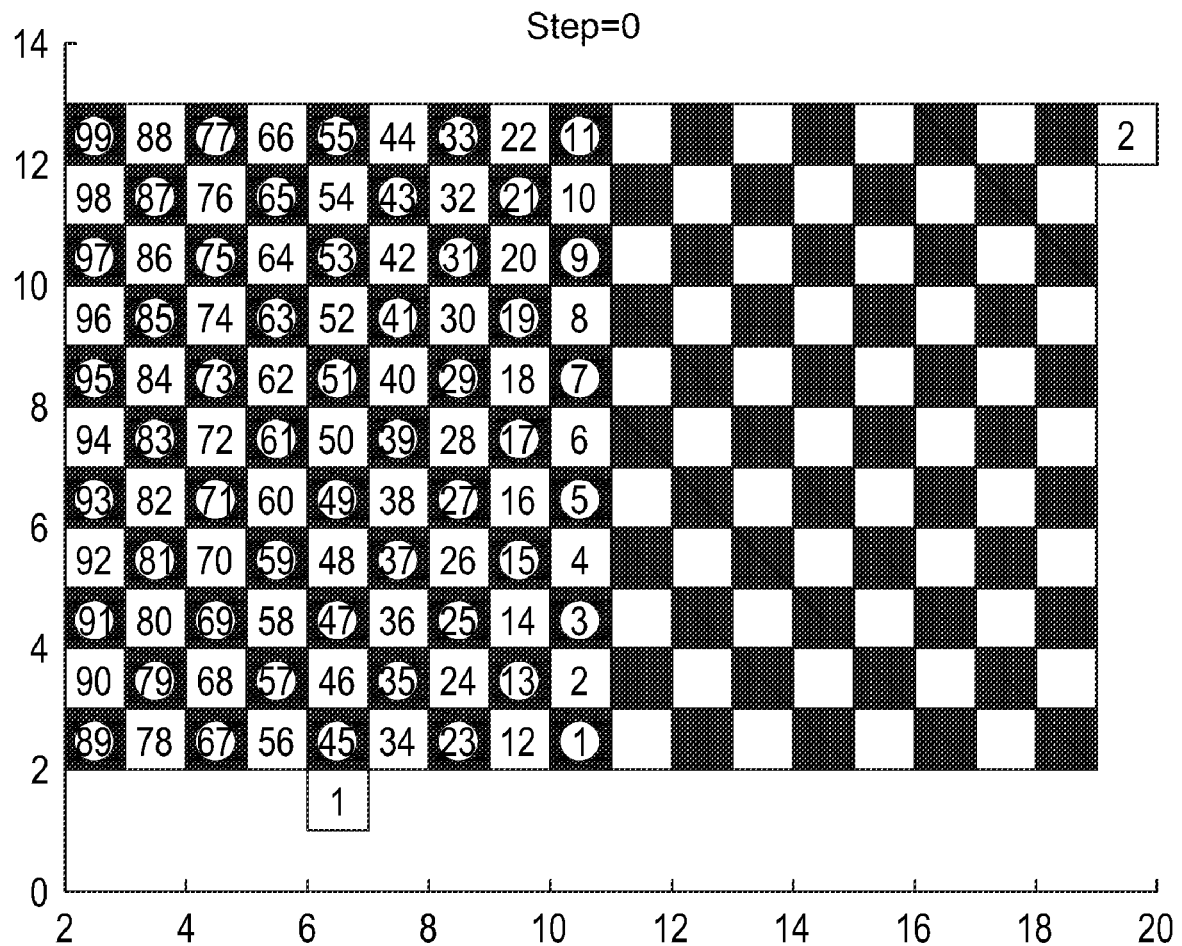
FIG. 29 shows a room containing 02 exits known as "1" and "2", and containing 99 people "P:1" to "P:99"

Thus the lists, once ordered, taking into account the criteria (leaving an increment between two users following one another) give the following optimized evacuation positions, see FIGS. 27-28:

2. Extraction Scenario in the Case of a Densely Occupied Room (99 People) Having 2 Doors, See FIG. 29
(a) By the criterion of the shortest distance between the user and the doors, 89 users would be assigned to the door "1", 6 users assigned to the door "2", 4 users being at equal distance from both doors.
(b) The assumption is made that one must, in movement, always leave an empty square between two users (to avoid collisions). It is also assumed that the displacement speed is uniform (in general: an average of 1.2 m/s, at normal pace).
(c) At least 177 time increments would then have been necessary to entirely evacuate the room: 1 increment for the person "P45" and ((1+1) increments for the 88 other users nearer to door "1" than to door "2").
(d) By managing the waiting lists of the 2 doors in an optimized manner, the complete evacuation time is reduced to 103 time increments, the waiting lists being first compiled then managed similarly to that explained in the scenario of building clearance in "Zip" form.

Figure 30:
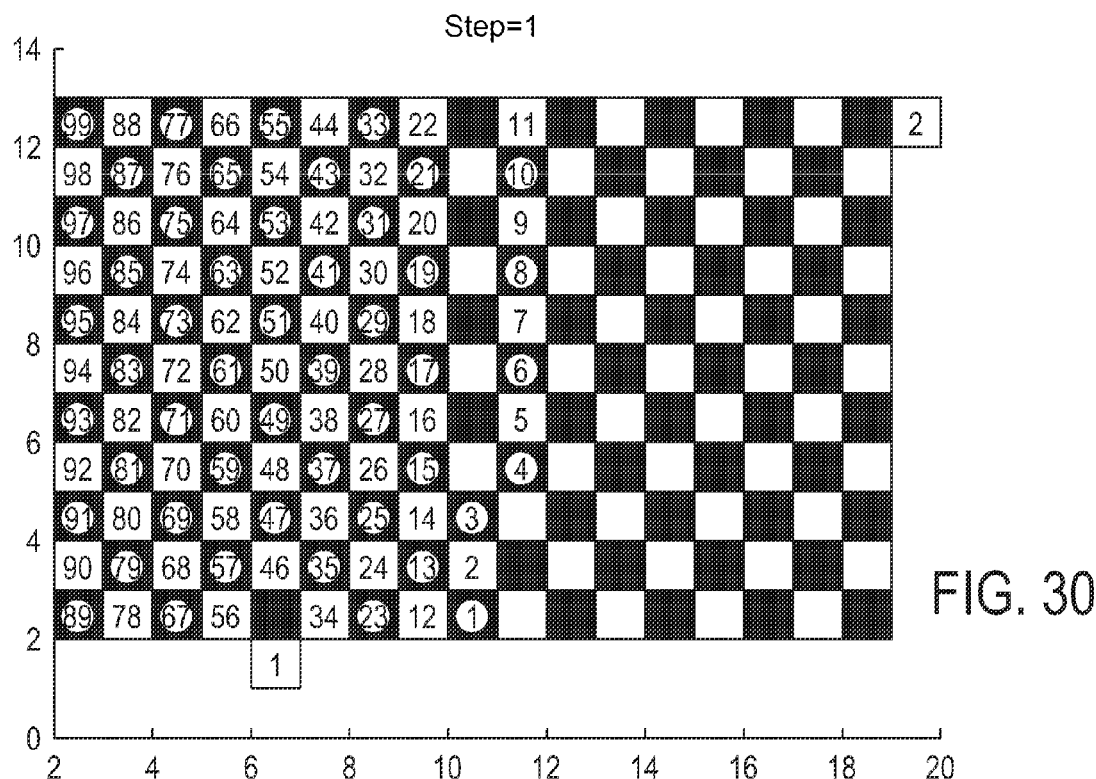
FIG. 30 shows the positions of the users after the first time step.
Figure 31:
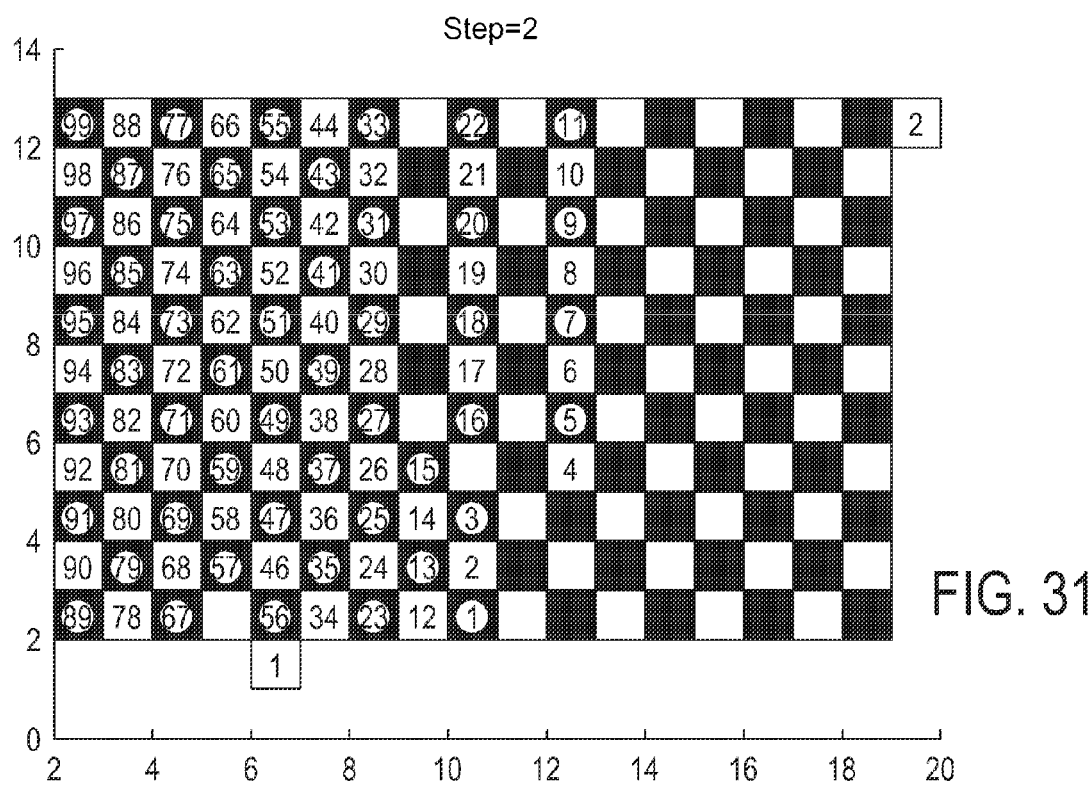
FIG. 31 shows the positions of the users after the second time step.
Figure 32:
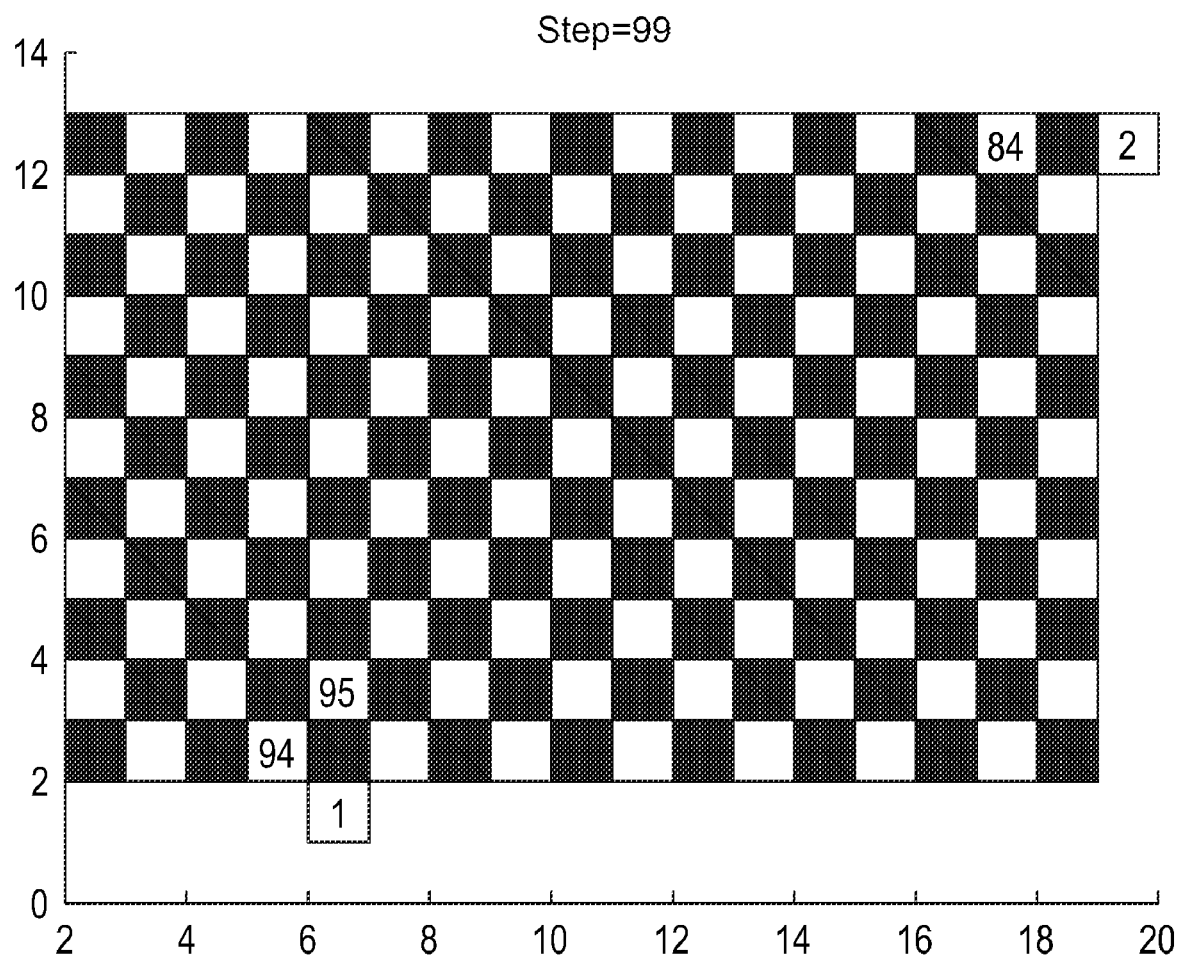
FIG. 32 shows the last users before complete evacuation.

A few positions, at arbitrarily chosen times, are illustrated by FIG. 30-31.

BIBLIOGRAPHY

E. Cetin, K. Dimitropoulos, B. Gouverneur, N. Grammalidis, O. Gunay, Y. H. Habiboglu, B. U. Toreyin, and S. Verstockt, "Video fire detection: a review," Digital Signal Processing, vol. 23, no. 6, pp. 1827-1843, 2013.

S. Cosar, G. Donatiello, V. Bogorny, C. Garate, L. Alvares, F. Bremond. Towards Abnormal Trajectory and Event Detection in Video Surveillance. IEEE Transactions on Circuits and Systems for Video Technology, 2016.

J. Fonollosa, A. Solórzano, S. Marco, Chemical Sensor Systems and Associated Algorithms for Fire Detection: A Review, Sensors, Volume: 18, 2018.

C. Jorgensen and S. Powell, Solving 0-1 Minimax Problems, in The Journal of the Operational Research Society Vol. 38, No. 6 (June, 1987), pp. 515-522.

Omprakash Gnawali and Philip Levis. The ETX Objective Function for RPL, draft-gnawali-roll-etxof-00, IETF, 2010.

Omprakash Gnawali and Philip Levis. The Minimum Rank with Hysteresis Objective Function. RFC 6719. RFC Editor, 2012.

H. Wang, A. Klaser, C. Schmid, and C.-L. Liu, "Action recognition by dense trajectories," in Computer Vision and Pattern Recognition (CVPR), 2011 IEEE Conference on, June 2011, pp. 3169-3176.

The invention claimed is:

1. A method for localization and updated guidance for movements of users through a building, which has spaces delimited by obstacles to such movements, said updated $$\begin{Bmatrix} \text{User} & \text{Door: 1} & \text{Door: 2} & \text{assignment:evacuation} \\ 1 & \max(3, 0+1) = 3 & \max(7, 0+1) = 7 & \min(3, 7) = 3 \text{ increments @door 1} \\ 2 & \max(4, 3+2) = 5 & \max(8, 0+1) = 8 & \min(5, 8) = 5inc. \text{ @door 1} \\ 3 & \max(5, 5+2) = 7 & \max(9, 0+1) = 9 & \min(7, 9) = 7inc. \text{ @door 1} \\ 4 & \max(6, 7+2) = 9 & \max(10, 0+1) = 10 & \min(9, 10) = 9inc. \text{ @door 1} \\ 5 & \max(7, 9+2) = 11 & \max(11, 0+1) = 11 & \min(11, 11) = 11inc. \text{ @door 1(or 2)} \\ 6 & \max(8, 11+2) = 13 & \max(12, 0+1) = 12 & \min(13, 12) = 12inc. \text{ @door 2} \\ 7 & \max(9, 11+2) = 13 & \max(13, 12+2) = 14 & \min(13, 14) = 13inc. \text{ @door 1} \\ 8 & \max(10, 13+2) = 15 & \max(14, 12+2) = 14 & \min(15, 14) = 14inc. \text{ @door 2} \\ 9 & \max(11, 13+2) = 15 & \max(15, 14+2) = 16 & \min(15, 16) = 15inc. \text{ @door 1} \\ 10 & \max(12, 15+2) = 17 & \max(16, 14+2) = 16 & \min(17, 16) = 16inc. \text{ @door 2} \\ 11 & \max(13, 15+2) = 17 & \max(17, 16+2) = 18 & \min(17, 18) = 17inc. \text{ @door 1} \end{Bmatrix}$$

guidance being done as a function of an event in the building, along paths leading to one or more given target places ("E", "S", "W"), the guidance being adapted to each user,
  with connected objects (T, T') in a wireless communication link with a remote resource server which is a control server (S) accessible by a communication network, via at least one communication terminal (B)
  comprising the following steps:
    i— on the basis of a digital model of the building (BIM, CIM)
  computing means (M) connected to the control server (S) automatically define and compute nodes,
  the nodes being divided into dispatcher nodes (Nd) and passage nodes (N), the passage nodes (N) being points on a path which must be taken by the users to move to one or the given target places ("E", "S", "W"), the passage nodes (N) being each associated with a dispatcher node (Nd);
  said computing means (M) automatically define and compute edges (A), each edge linking two successive ones of said nodes (N, Nd) by crossing the spaces without encountering the obstacles;
  said computing means (M) connected to the control server (S) to assign to each passage node an updated user waiting list on the basis of user profiles, each user profile determining the nodes and edges, specific to each profile, through which the users can move;
  said computing means (M) automatically compute, taking into account the obstacles, a Directed Acyclic Graph (DAG) of movement toward the target place or places composed of the nodes (N, Nd) and the edges (A),
    ii— sensors (C) detect, automatically, semi-automatically or manually, an event and its actual location in the building, which is stored in the control server (S);
    iii— said computing means (M) compute the actual position of each user located in the building,
    with for the enclosed spaces, a measurement of power of a reception signal of a given connected object of the user, embodied by a wireless communication link to the communication terminal or terminals (B) in communication link with the control server (S), the communication terminal or terminals (B) having a position identified in the digital model (BIM, CIM);
    iv— as a function of a nature of the event causing inaccessibility of certain nodes (N, Nd) of the directed acyclic graph (DAG), said computing means (M) compute an updated directed acyclic graph (DAG') of movement toward the target places ("E", "S", "W");
    v— said computing means (M) snap actual positions of the users to the digital model and compute the dispatcher node (Nd) associated with each user and located as near as possible to the user;
    vi— on the basis of the updated directed acyclic graph (DAG') and of the dispatcher node (Nd) associated with each user, said computing means (M) compute for each user an associated sub-graph (DODAG') which corresponds to the path personalized to each user, toward a given target place ("E", "S", "W"),
    the associated sub-graph (DODAG') for each user being computed using:
      an individual objective function for each dispatcher node (Nd), based on the user profile, constructed to:
      assign to each user, and update all its passage nodes (N) associated with the dispatcher node (Nd), near which each user is found,
      compile and update the waiting lists of each passage node (N) associated with the dispatcher node (Nd), for the user,
      compile and update the waiting lists of each passage node (N) for the user throughout the whole building, making it possible to obtain one or more associated sub-graphs (DODAG') per user,
      a general objective function constructed on the basis of the individual objective functions of all the users, which has as input the waiting lists of each passage node (N) of the whole building of all the users, and as output the associated sub-graphs (DODAG') of all the users, the general objective function delivering to each user its sub-graph (DODAG') computed to optimize all the individual objective functions of all the users, with respect to input parameters,
    said computing means (M) repeat the preceding steps ii to vi, to update the guidance of each user spatially and temporally,
    at a given time frequency adapted to the event,
      vii— said computing means (M) guide, using personalized interfaces/signals, each user via its connected object (T) or connected objects (T') of the building, to follow its associated sub-graph (DODAG'), toward a given target place ("E", "S", "W").

2. The method according to claim 1, wherein the obstacles comprise walls and also objects or other obstructions to the passage of users and/or appearing during events.

3. The method according to claim 1, wherein the optimization of the general objective function is performed with one of the following strategies:
  linear;
  MRHOF;
  ETXOF;
  min max strategy;
  fuzzy logic.

4. The method according to claim 1, wherein the profiles of the users include the following information, for the purpose of computing the personalized DODAG':
  mobility category: Person with Reduced Mobility, child;
  age of the user;
  presence of other specific users;
  the different profiles distinguished.

5. The method according to claim 4, wherein the input parameters are a time and/or a distance of travel of the users to the target place or places ("E", "S", "W").

6. The method according to claim 1, wherein the event is an emergency and the method is used to evacuate the users toward the target places ("E", "S", "W") which are exits of the building or withdrawal zones and shelters.

7. The method according to claim 1, wherein the event is not an emergency and the method makes it possible to route the users to the target places ("E", "S", "W").

8. The method according to claim 1, wherein in step ii, said computing means (M) determine the nature of the event and its actual location in the building:
  a) automatically by algorithms and/or
  b) manually by inputting user information which is sent to the control server (S), in order to determine in the directed acyclic graph (DAG), the nearest nodes (N) to the event.

9. The method according to claim 1, wherein the building has several floors, and in the step vi said computing means (M) compute a sub-graph DODAG', on the basis of each passage node (N), on all the floors interconnected via the inter-floor passage nodes (N) to form the overall directed acyclic graph (DAG) to process any position in the building.

10. The method according to claim 1, wherein in step ii, in a learning step, said computing means (M) measure the power of the reception signal of the connected object located at known positions in the building as a function of the at least one communication terminal (B), use a relationship between power of the reception signal and position in the building to determine the position of the user.

11. The method according to claim 1, wherein the personalized interfaces/signals of step vii are:
- images on a screen,
- by virtual and augmented reality, and/or
- sound indication, directional vibrations on wristbands or sticks, guiding by an agent or light signal, drones.

12. The method according to claim 1, wherein the personalized interfaces/signals of step vii are embodied on the connected objects (T) embedded by each user which are intended for individualized position and the individualized guidance of each user.

13. A device for localization and guidance of user movements through a building which has enclosed spaces and/or open spaces delimited by obstacles to the user movements,
said guidance being performed in relation to an event in the building, along paths leading to one or more given target places ("E", "S", "W"),
the guidance being adapted to each user,
the device comprising:
a remote resource server which is a control server (S) accessible by a communication network;
sensors (C) linked to the control server (S) for detecting an event, and its actual location in the building, which is stored on the control server (S);
at least one communication terminal (B) in communication link with the control server (S), to facilitate a wireless communication link between connected objects (T) of users and the control server (S) via the at least one communication terminal (B),
computing means (M) linked to the control server (S) which are configured to:
i— on the basis of a digital model of the building (BIM, CIM),
compute nodes (N) divided into: dispatcher nodes ($N_d$) and passage nodes, the passage nodes being points on the path that must be taken by the users to move toward the various given target places ("E", "S", "W") while avoiding the obstacles;
compute edges (A), each edge linking two successive ones of said nodes (N) by crossing the spaces without encountering obstacles,
assign, to each passage node, a user waiting list on the basis of user profiles, each user profile determining the nodes and edges through which the users can move,
automatically compute a Directed Acyclic Graph (DAG) of movement toward the target places composed of the nodes (N, Nd) and the edges (A), and specific to each user profile,
ii+iii— compute the actual position of each user located in the building,
with for the enclosed spaces a measurement of power of a reception signal of a given connected object of the user, embodied by a wireless communication link to one or more of said communication terminals (B), the said one or more communication terminals (B) having a position identified in the digital model of the building (BIM, CIM);
iv— compute an updated Directed Acyclic Graph (DAG') of movement toward the target places as a function of a nature of the event causing inaccessibility of certain nodes of the Directed Acyclic Graph (DAG);
v— snap actual positions of the users to the digital model and compute the dispatcher node (Nd) associated with each user and located as near as possible to the user;
vi— on the basis of the updated directed acyclic graph, and of the dispatcher node (Nd) associated with each user, compute for each user an associated sub-graph (DODAG') which corresponds to the path personalized to each user, toward a given target place ("E", "S", "W"),
the sub-graph (DODAG') which corresponds to the path personalized to each user, toward a given target place ("E", "S", "W"), being computed using:
an individual objective function for each dispatcher node (Nd), based on the profile of the user, constructed to:
assign to each user and update all its passage nodes associated with the dispatcher node (Nd), near which each user currently is,
compile and update for the user the waiting lists of each passage node (N) associated with the dispatcher node (Nd),
compile and update the waiting lists of each passage node (N) for the user over the whole building,
a general objective function constructed on the basis of the individual objective functions, of all the users,
which has as input the user waiting lists of each of the passage nodes (N) of the whole building, and as output the sub-graphs (DODAG') of all the users,
the general objective function delivering to each user its sub-graph (DODAG') computed to optimize all the individual objective functions of all the users with respect to input parameters;
vii— repeat the following steps ii to vi, in order to update the guidance spatially and temporally, at a given time frequency that is adapted to the event.

14. The device (D) according to claim 13, wherein the obstacles comprise walls and also objects or other obstructions to the passage of users and/or appearing during events.

15. The device (D) according to claim 14, wherein the optimization of the general objective function is performed with one of the following strategies:
- linear;
- MRHOF;
- ETXOF;
- min max strategy;
- fuzzy logic.

16. The device (D) according to claim 13, wherein the input parameters are a time and/or a distance of travel of the users to the target place or places ("E", "S", "W").

17. The device (D) according to claim 13, wherein:
the dispatcher nodes (Na) are centroidal points in a space comprising a room, hall, corridor;
the passage nodes (N) are doors, entrances and exits of lifts, top and bottom points of ramps, stairs, escalators, moving walkways, or mobile cabins.

18. The device (D) according to claim 13, wherein the computing means (M) are configured to determine the nature of the event automatically or semi-automatically.

19. The device (D) according to claim 13, wherein the connected objects (T, T') are chosen out of the following list:

Smartphone,
Connected stick,
Connected wheelchair,
Tablet,
Connected screen,
Connected visor,
Connected wristband,
Connected luminous device,
Communication devices for security/evacuation officers,
Connected robot,
Connected drone.

20. The device (D) according to claim 13, wherein the communication terminals (B) are fixed and/or mobile, and are Wi-Fi communication terminals.

\* \* \* \* \*